United States Patent
Sakuyama

(10) Patent No.: US 12,288,407 B2
(45) Date of Patent: Apr. 29, 2025

(54) IMAGE PROCESSING APPARATUS, IMAGE PROCESSING METHOD, AND NON-TRANSITORY RECORDING MEDIUM

(71) Applicant: Hiroyuki Sakuyama, Tokyo (JP)

(72) Inventor: Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 393 days.

(21) Appl. No.: 17/812,258

(22) Filed: Jul. 13, 2022

(65) Prior Publication Data

US 2023/0027065 A1  Jan. 26, 2023

(30) Foreign Application Priority Data

Jul. 16, 2021  (JP) ................. 2021-117728

(51) Int. Cl.
*G06V 30/148* (2022.01)
*G06T 3/40* (2006.01)
*G06V 30/14* (2022.01)

(52) U.S. Cl.
CPC .............. *G06V 30/153* (2022.01); *G06T 3/40* (2013.01); *G06V 30/1448* (2022.01)

(58) Field of Classification Search
CPC ............ G06V 30/153; G06V 30/1448; G06V 30/184; G06V 30/166; G06T 3/40
See application file for complete search history.

(56) References Cited

U.S. PATENT DOCUMENTS

2015/0310318 A1* 10/2015 Kasai ................... G06V 30/414
                                                         358/1.2
2016/0210768 A1*  7/2016 Yoo .......................... G09G 5/00
2017/0004114 A1*  1/2017 Ichida .................. G06F 40/106
2019/0230233 A1*  7/2019 Oya ..................... G06V 30/1463

FOREIGN PATENT DOCUMENTS

| JP | 11-338973    | 12/1999 |
| JP | 2004-241827  | 8/2004  |
| JP | 2008-017032  | 1/2008  |
| JP | 2010-288229  | 12/2010 |
| JP | 2012-104028  | 5/2012  |

* cited by examiner

*Primary Examiner* — Xuemei G Chen
*Assistant Examiner* — Han Hoang
(74) *Attorney, Agent, or Firm* — IPUSA, PLLC

(57) ABSTRACT

An image processing apparatus includes circuitry to set first upper limit values for vertical and horizontal sizes of a character included in image data for erecting direction determination, segment the image data in units of character into a plurality of rectangular areas, determine, in the image data, a plurality of first rectangular areas each of which satisfies the first upper limit values, perform character recognition on characters in the plurality of first rectangular areas in four directions of a +X direction, a −X direction, a +Y direction, and a −Y direction, calculate degrees of certainty of the four directions, determine whether a direction having a highest degree of certainty among the calculated degrees of certainty of the four directions is an erecting direction of the image data to output a determination result, and perform, along the erecting direction, character recognition on characters in a plurality of second rectangular areas of the image data, the plurality of second rectangular areas satisfying second upper limit values for the vertical and horizontal sizes smaller than the first upper limit values for erecting direction determination.

10 Claims, 9 Drawing Sheets

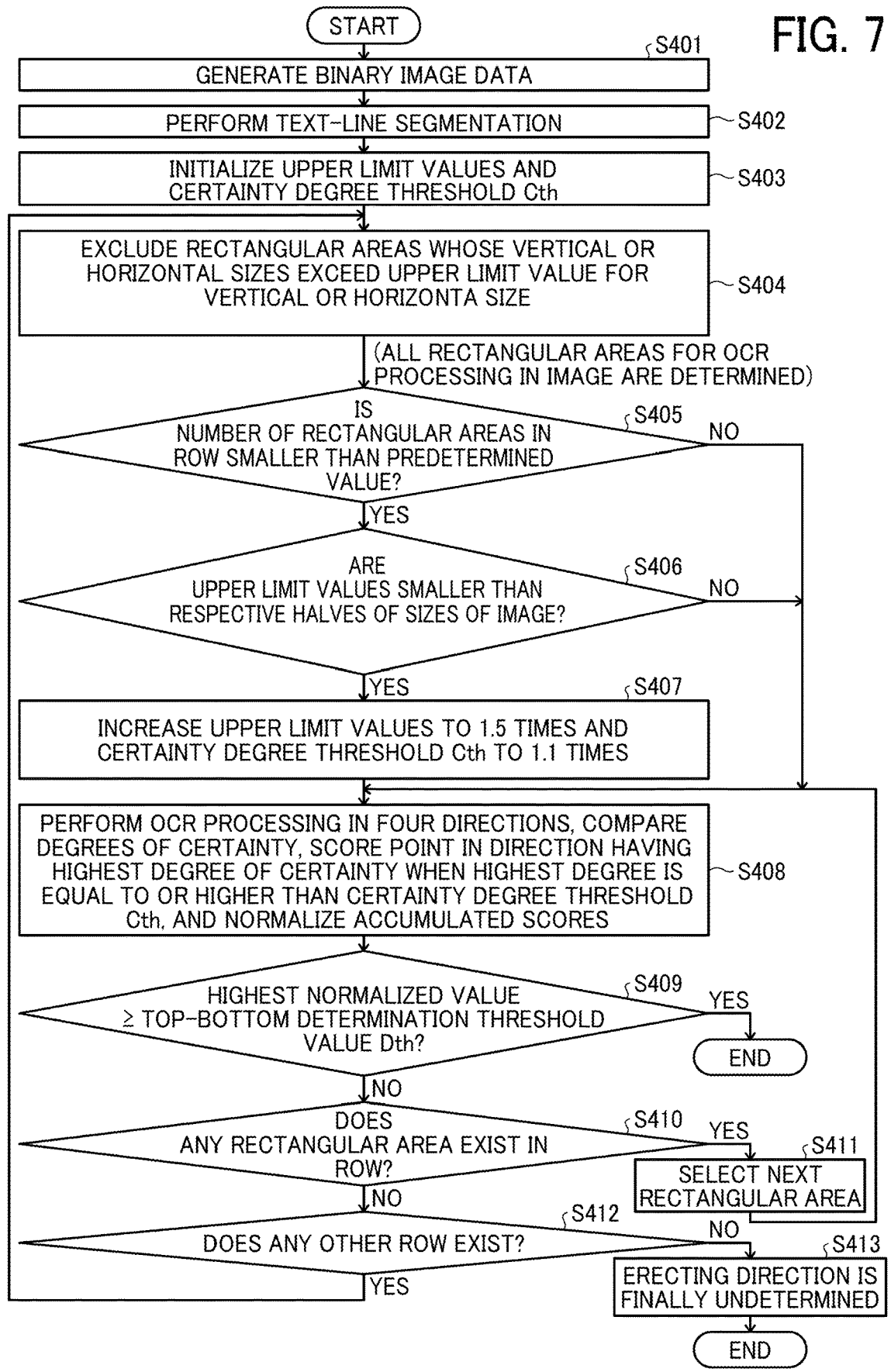

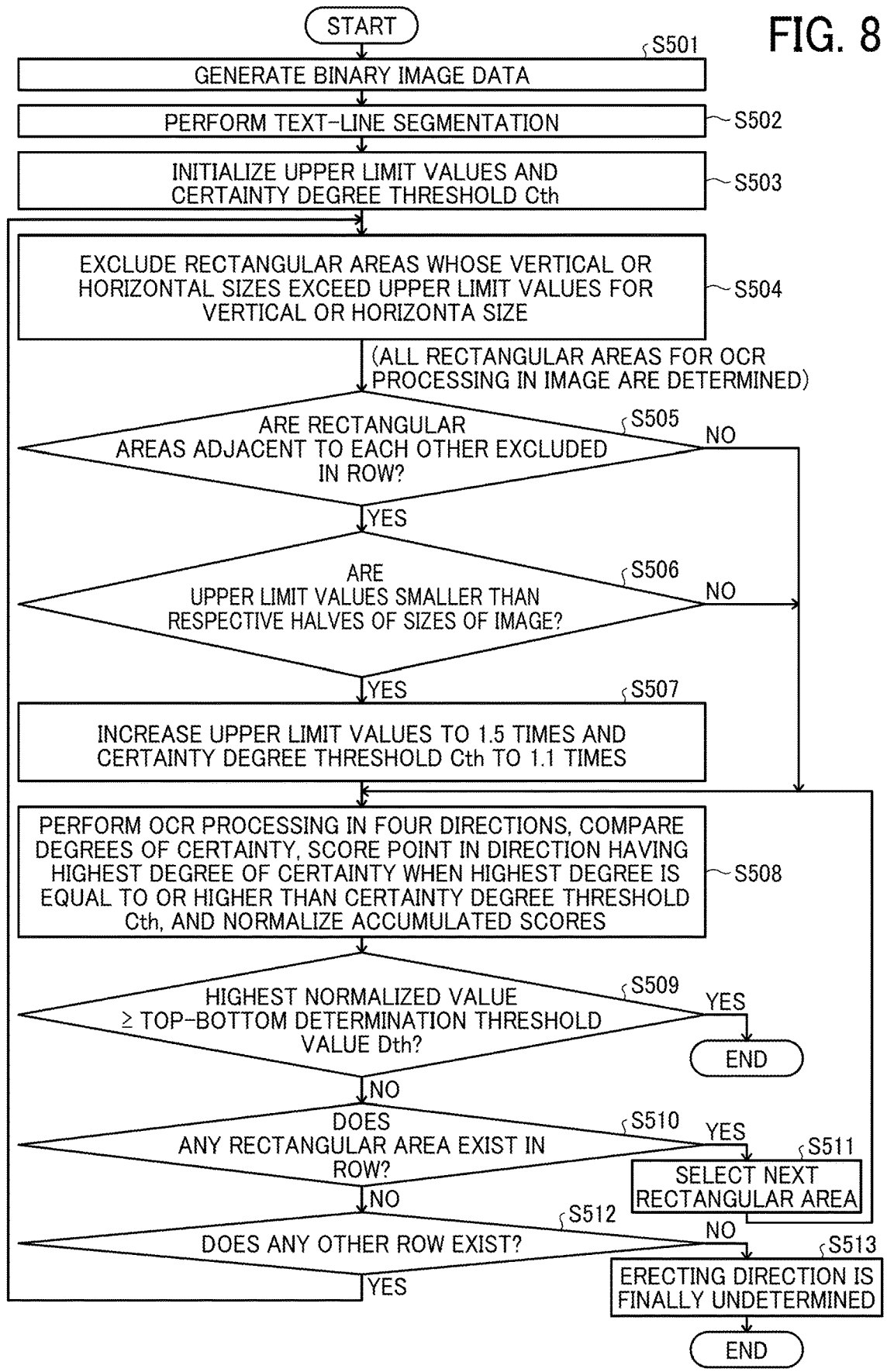

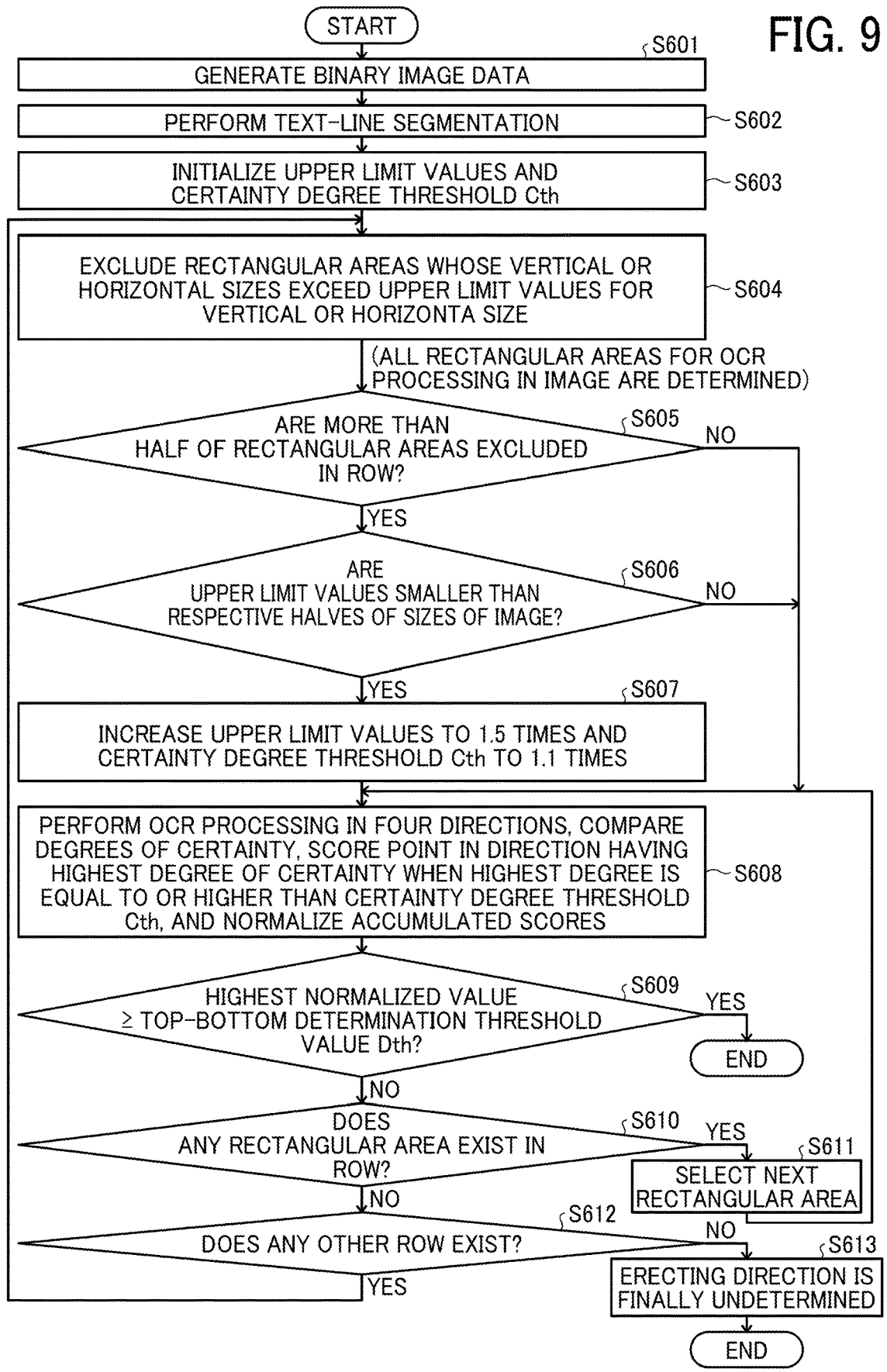

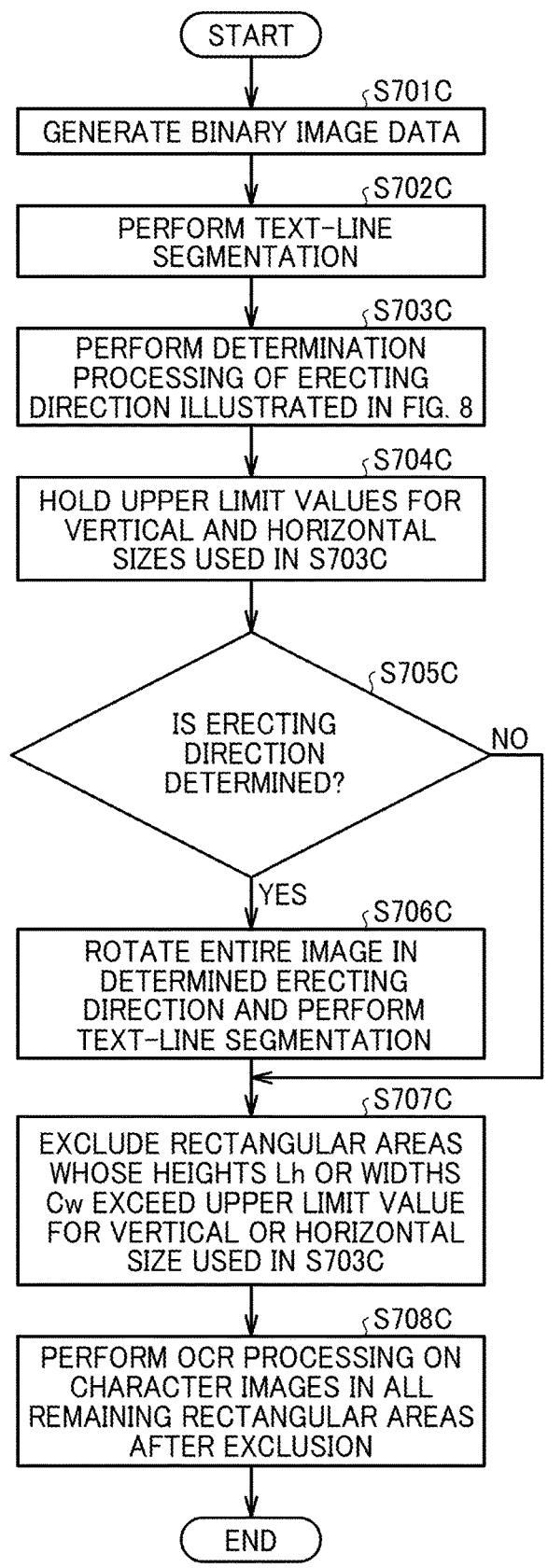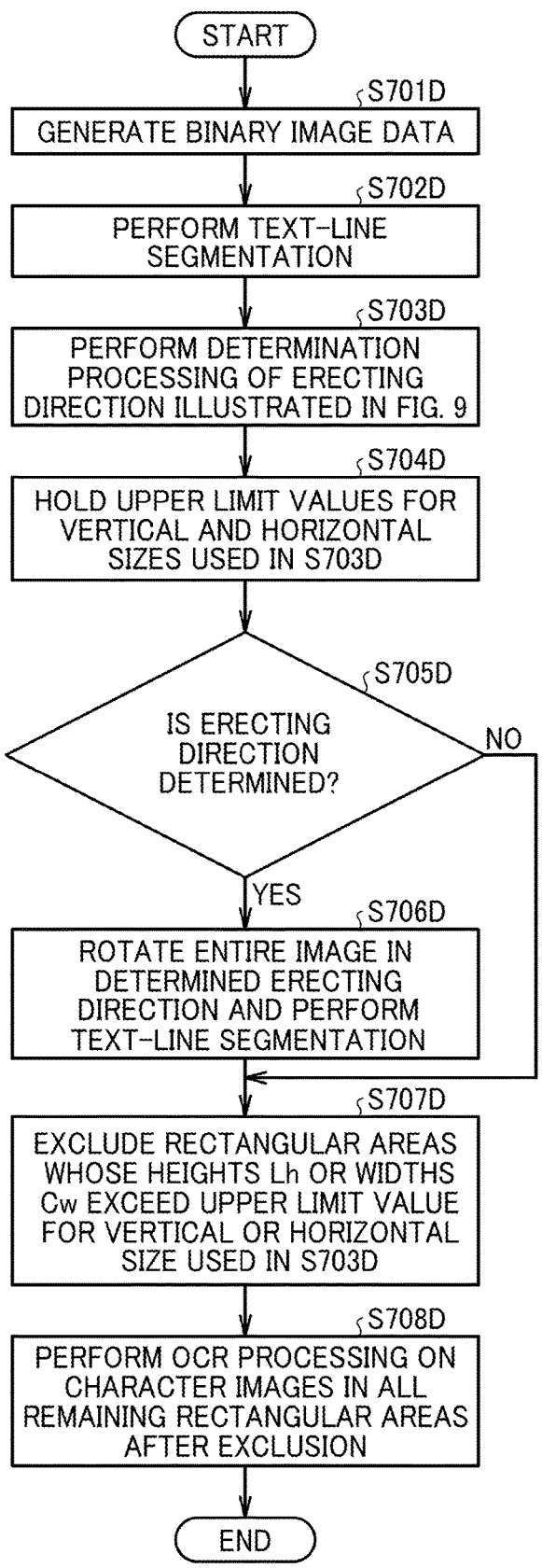

IMAGE PROCESSING APPARATUS, IMAGE PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-117728, filed on Jul. 16, 2021, in the Japan Patent Office, the entire disclosure of which is hereby incorporated by reference herein.

BACKGROUND

Technical Field

The present disclosure relates to an image processing apparatus, an image processing method, and a non-transitory recording medium.

Related Art

There is known a technique, as one of character recognition methods, to read an image with a photoelectric conversion device (means) having a large number of pixels for high resolution and a photoelectric conversion device (means) having a small number of pixels for low resolution. In performing the character recognition, image data obtained by reading with the photoelectric conversion device for the high resolution is used in a case where characters as objects for the character recognition are small in size, whereas image data obtained by reading with the photoelectric conversion device for the low resolution is used in a case where characters as objects for the character recognition are large in size.

To perform the character recognition on characters whose sizes vary in a simple configuration, there has been proposed a technique to determine whether sizes of characters that are objects for the character recognition in image data are larger than a predetermined size. In a case where the sizes of the characters in the image data are determined to be larger than the predetermined size, at least, in the image data, an area having such large characters is reduced so that the sizes of the characters do not exceed the predetermined size. Then, the character recognition is performed using the reduced image data.

In the above-described technique, attention is focused on a size of a character in performing the character recognition, and the focus on the size of a character causes an increase of amount of the character recognition due to the processing of reducing the image data.

By the way, an erecting direction of a character image read by scanning is unknown. For this reason, it is necessary to determine the erecting direction of the character image and then perform ordinary character recognition along the determined erecting direction.

To determine the erecting direction of a character image, there is known a technique of performing optical character recognition (OCR) on character images (being sampled) included in a scanned document in directions rotated by 90 degrees at each time and determining a direction having the highest degree of certainty or confidence (a direction in which the character images are likely to be read) to be the erecting direction.

In such determination processing of the erecting direction using the OCR processing, an amount of the OCR processing increases when the OCR processing is performed on all the character images included in the scanned document. To avoid such an inconvenience, it is common to segment a part of the character images and perform the determination processing of an erecting direction on the segmented character images.

SUMMARY

In one aspect, an image processing apparatus includes circuitry to set first upper limit values for vertical and horizontal sizes of a character included in image data for erecting direction determination, segment the image data in units of character into a plurality of rectangular areas, determine, in the image data, a plurality of first rectangular areas each of which satisfies the first upper limit values, perform character recognition on characters in the plurality of first rectangular areas in four directions of a +X direction, a −X direction, a +Y direction, and a −Y direction, calculate degrees of certainty of the four directions, determine whether a direction having a highest degree of certainty among the calculated degrees of certainty of the four directions is an erecting direction of the image data to output a determination result, and perform, along the erecting direction, character recognition on characters in a plurality of second rectangular areas of the image data, the plurality of second rectangular areas satisfying second upper limit values for the vertical and horizontal sizes smaller than the first upper limit values for erecting direction determination.

In another aspect, an image processing method, the method includes setting first upper limit values for vertical and horizontal sizes of a character included in image data for erecting direction determination, segmenting the image data in units of character into a plurality of rectangular areas, determining, in the image data, a plurality of first rectangular areas each of which satisfies the first upper limit values, performing character recognition on characters in the plurality of first rectangular areas in four directions of a +X direction, a −X direction, a +Y direction, and a −Y direction, calculating degrees of certainty of the four directions, determining whether a direction having a highest degree of certainty among the calculated degrees of certainty of the four directions is an erecting direction of the image data to output a determination result, and performing, along the erecting direction, character recognition on characters in a plurality of second rectangular areas of the image data, the plurality of second rectangular areas satisfying second upper limit values for the vertical and horizontal sizes smaller than the first upper limit values for erecting direction determination.

In another aspect, a non-transitory recording medium storing a plurality of program codes which, when executed by one or more processors, causes the processors to perform a method. The method includes setting first upper limit values for vertical and horizontal sizes of a character included in image data for erecting direction determination, segmenting the image data in units of character into a plurality of rectangular areas, determining, in the image data, a plurality of first rectangular areas each of which satisfies the first upper limit values, performing character recognition on characters in the plurality of first rectangular areas in four directions of a +X direction, a −X direction, a +Y direction, and a −Y direction, calculating degrees of certainty of the four directions, determining whether a direction having a highest degree of certainty among the calculated degrees of certainty of the four directions is an erecting direction of the image data to output a determination result, and performing, along the erecting direction, character recognition on characters in a plurality of second rectangular areas of the image data, the plurality of second rectangular areas satisfying second upper limit values for the vertical and horizontal sizes smaller than the first upper limit values for erecting direction determination.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a flowchart illustrating processing performed by one of the image processing apparatuses according to a second embodiment of the present disclosure;

FIG. 8 is a flowchart illustrating processing performed by one of the image processing apparatuses according to a third embodiment of the present disclosure;

FIG. 9 is a flowchart illustrating processing performed by one of the image processing apparatuses according to a fourth embodiment of the present disclosure; and FIGS. 10A to 10D are flowcharts illustrating processing performed by one of the image processing apparatuses according to a fifth embodiment of the present disclosure.

Figure 1:
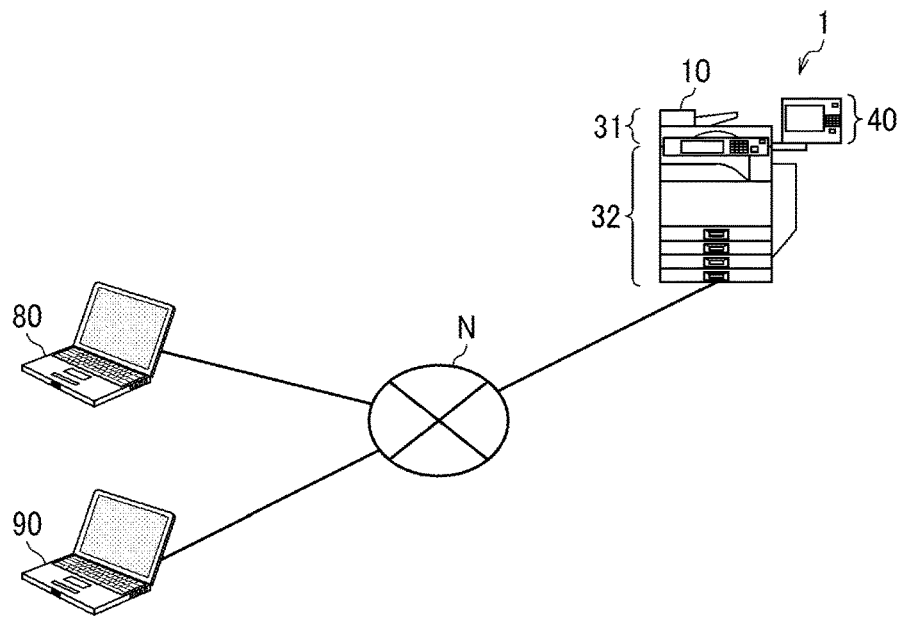
FIG. 1 is a schematic diagram illustrating an example of a configuration of an image processing system including image processing apparatuses according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the present disclosure, an information processing system includes the following configuration to increase accuracy of determination processing of an erecting direction of a character image included in image data.

An image processing apparatus according to the present disclosure determines an erecting direction of a character image included in image data and performs ordinary character recognition on the character image along the erecting direction. The image forming apparatus includes an area segmentation unit, a certainty calculation unit, an erecting direction determination unit, and a control unit. The area segmentation unit sets upper limit values for vertical and horizontal sizes of the character image included in the image data and segments the image data in units of character images into a plurality of rectangular areas satisfying the upper limit values for the vertical and horizontal sizes. The certainty calculation unit performs the character recognition on each of the plurality of character images in the rectangular areas in four directions of a +X direction, a −X direction, a +Y direction, and a −Y direction and calculates degrees of certainty of the four directions. The erecting direction determination unit determines a direction having the highest degree of certainty among the degrees of certainty of the four directions calculated by the certainty calculation unit to be an erecting direction of the image data. In a case where the erecting direction determination unit determines the erecting direction, the control unit increases the upper limit values for the vertical and horizontal sizes to be set in the area segmentation unit to be larger than the upper limit values for the vertical and horizontal sizes used in the ordinary character recognition.

If the character recognition is performed using the reduced image data, accuracy of the determination processing of the erecting direction may be lowered. By contrast, the above-described configuration of the information processing system increases accuracy of the determination processing of the erecting direction of a character image included in the image data.

Descriptions are given of the present disclosure with reference to the drawings. However, elements, types, combinations of elements, shapes of the elements, and relative positions of elements in the embodiments are examples and do not limit the scope of appended claims.

Configuration of Image Processing System

FIG. 1 is a schematic diagram illustrating an example of a configuration of an image processing system including image processing apparatuses according to the embodiments of the present disclosure.

An image processing system 1 includes an image forming apparatus 10 and two personal computers (PCs) 80 and 90 that are examples of the image processing apparatuses, which transmit and receive data to and from each other via a communication network N.

The image forming apparatus 10 is a multifunction peripheral (MFP) including a scanner engine 31 to read a document sheet, a printer engine 32 to form an image on a sheet, a communication function, and the like. In a case where the image forming apparatus 10 includes an automatic document feeder (ADF), the scanner engine 31 reads the document sheet fed from the ADF. The image forming apparatus 10 uses the scanner engine 31 and the printer engine 32 to provide a user with functions of copying, printing, scanning, and facsimile communication. The image forming apparatus 10 receives an instruction from a user via a control panel 40 or receives an instruction from the PCs 80 and 90 via the communication network N to perform such functions.

The image forming apparatus 10 also has functions of extracting a text of electronic data from a scanned image read by the scanner engine 31 using a technique of optical character recognition and creating an editable document (e.g., a MICROSOFT WORD document) based on the extracted text of electronic data and the scanned image. Hereinafter, the technique of optical character recognition is simply referred to as "character recognition" or "OCR processing" as necessary.

The PCs 80 and 90 are terminals (computers) used by ordinary users who use the image forming apparatus 10.

The image forming apparatus 10, the PC 80, and the PC 90 illustrated in FIG. 1 are examples of the image processing apparatuses according to the present disclosure.

Hardware Configuration of Image Forming Apparatus

Figure 2:
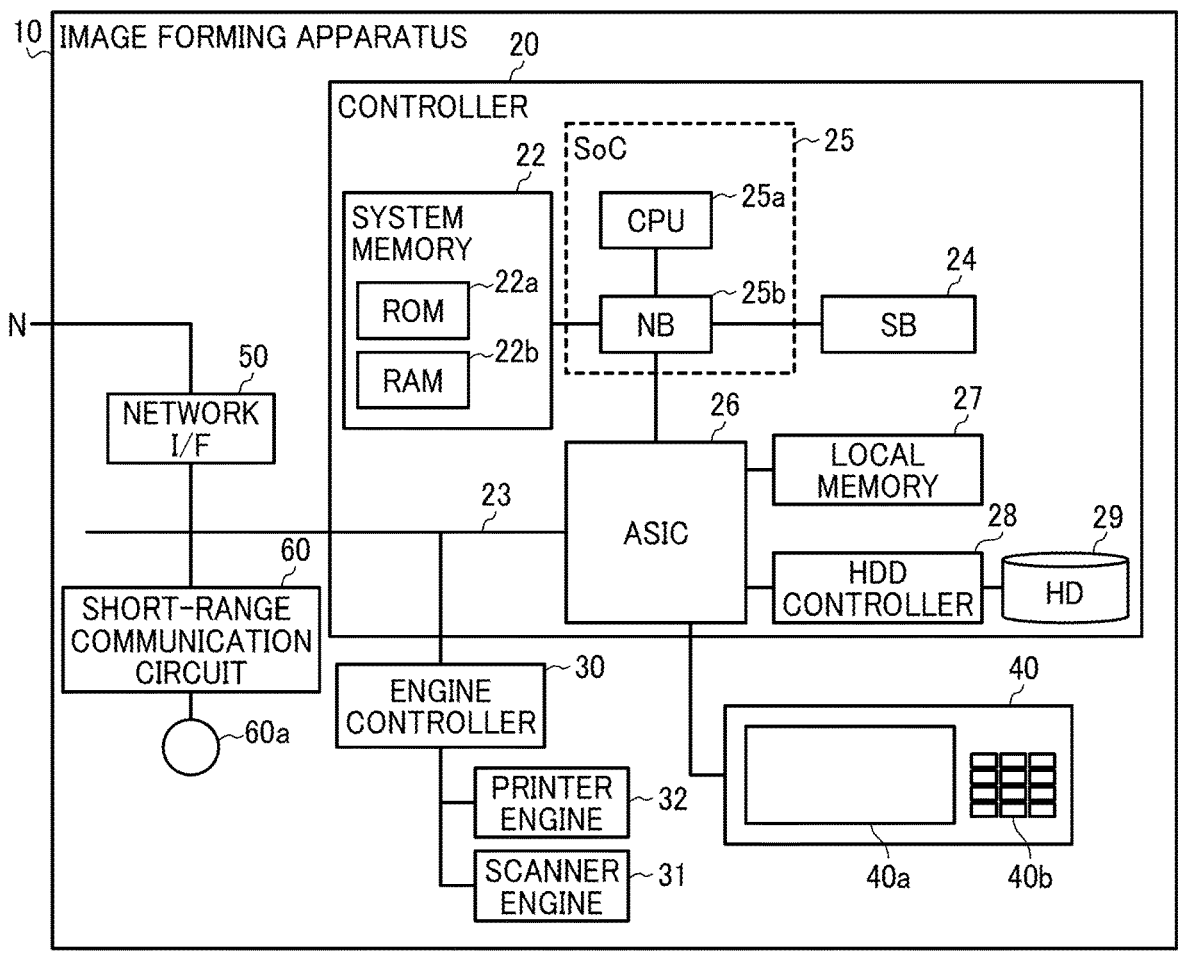
FIG. 2 is a block diagram illustrating an example of a hardware configuration of an image forming apparatus that is an example of the image processing apparatuses illustrated in FIG. 1.

FIG. 2 is a block diagram illustrating an example of a hardware configuration of the image forming apparatus 10 that is an example of the image processing apparatuses illustrated in FIG. 1.

As illustrated in FIG. 2, the image forming apparatus 10 includes a controller 20, a short-range communication circuit 60, an engine controller 30, the control panel 40, and a network interface (I/F) 50.

The controller 20 includes a central processing unit (CPU) 25a as a main component of a computer, a system memory 22, a north bridge (NB) 25b, a south bridge (SB) 24, an application specific integrated circuit (ASIC) 26, a local memory 27, a hard disk drive (HDD) controller 28, and a hard disk (HD) 29 as a storage area (a memory). The NB 25b and the CPU 25a are integrated into a system on a chip (SoC) 25.

The CPU 25a controls entire operation of the image forming apparatus 10. The NB 25b is a bridge for connecting the CPU 25a with the system memory 22 and the SB 24. The NB 25b includes a memory controller for controlling reading and writing of various data from and to the system memory 22, a peripheral component interconnect (PCI) master, and an accelerated graphics port (AGP) target.

The system memory 22 includes a read only memory (ROM) 22a as a memory that stores a program and data for implementing various functions of the controller 20. The system memory 22 further includes a random access memory (RAM) 22b used as a memory to load the program and the data, or as a drawing memory that stores drawing data for printing. The program stored in the ROM 22a may be stored in any computer-readable recording medium, such as a compact disc-read only memory (CD-ROM), compact disc-recordable (CD-R), or digital versatile disc (DVD), in a file format installable or executable by a computer for distribution.

The SB 24 is a bridge for connecting the NB 25b to a PCI device and a peripheral device. The ASIC 26 is an integrated circuit (IC) for image processing applications including hardware elements for image processing and has a role of a bridge for connecting a PCI bus 23, the HDD controller 28, and the local memory 27 one another. The ASIC 26 includes a PCI target, an AGP master, an arbiter (ARB) as a central processor of the ASIC 26, a memory controller to control the local memory 27, a plurality of direct memory access controllers (DMACs), and a PCI unit. The DMACs rotate image data by converting coordinates of the image data with, for example, a hardware logic. The PCI unit transfers data between the scanner engine 31 and the printer engine 32 via the PCI bus 23. The ASIC 26 may be connected to a universal serial bus (USB) interface, the Institute of Electrical and Electronics Engineers 1394 (IEEE1394) interface, or both.

The local memory 27 is a local memory used as a copy image buffer and a code buffer. The HD 29 is a storage in which a program for executing an operation described later and data for various controls are stored in advance, and is also used to accumulate image data as well as font data and forms used in printing. The HDD controller 28 controls reading and writing of various data from and to the HD 29 under control of the CPU 25a.

The short-range communication circuit 60 includes a communication circuit 60a in compliance with the near field communication (NFC), BLUETOOTH, or the like, and implements data communication with an IC card possessed by a user. When the user holds the IC card close to the communication circuit 60a, the short-range communication circuit 60 reads various information recorded in the IC card.

The engine controller 30 controls the scanner engine 31 and the printer engine 32. The control panel 40 includes a panel display 40a and an operation panel 40b. The panel display 40a is, for example, a touch panel that displays current settings or a selection screen and receives a user input. The operation panel 40b includes, for example, a numeric keypad and a start key. The numeric keypad receives assigned values of image forming parameters such as an image density parameter. The start key receives an instruction to start copying, for example. The controller 20 controls entire operation of the image forming apparatus 10. For example, the controller 20 controls rendering, communication, and user inputs from the control panel 40. The scanner engine 31 or the printer engine 32 includes an image processing unit for error diffusion, gamma conversion, and the like.

The image forming apparatus 10 may sequentially switch to select a document server function (a scanning function), a copying function, a printing function, and a facsimile communication function by an application switching key of the control panel 40. The document server function (scanner function) also functions to extract text from an image by OCR processing and convert the format of the extracted text into a format usable for various office applications.

The network I/F 50 is an interface for data communication through the network N. The short-range communication circuit 60 and the network I/F 50 are electrically connected to the ASIC 26 via the PCI bus 23.

Hardware Configuration of Personal Computer

Figure 3:
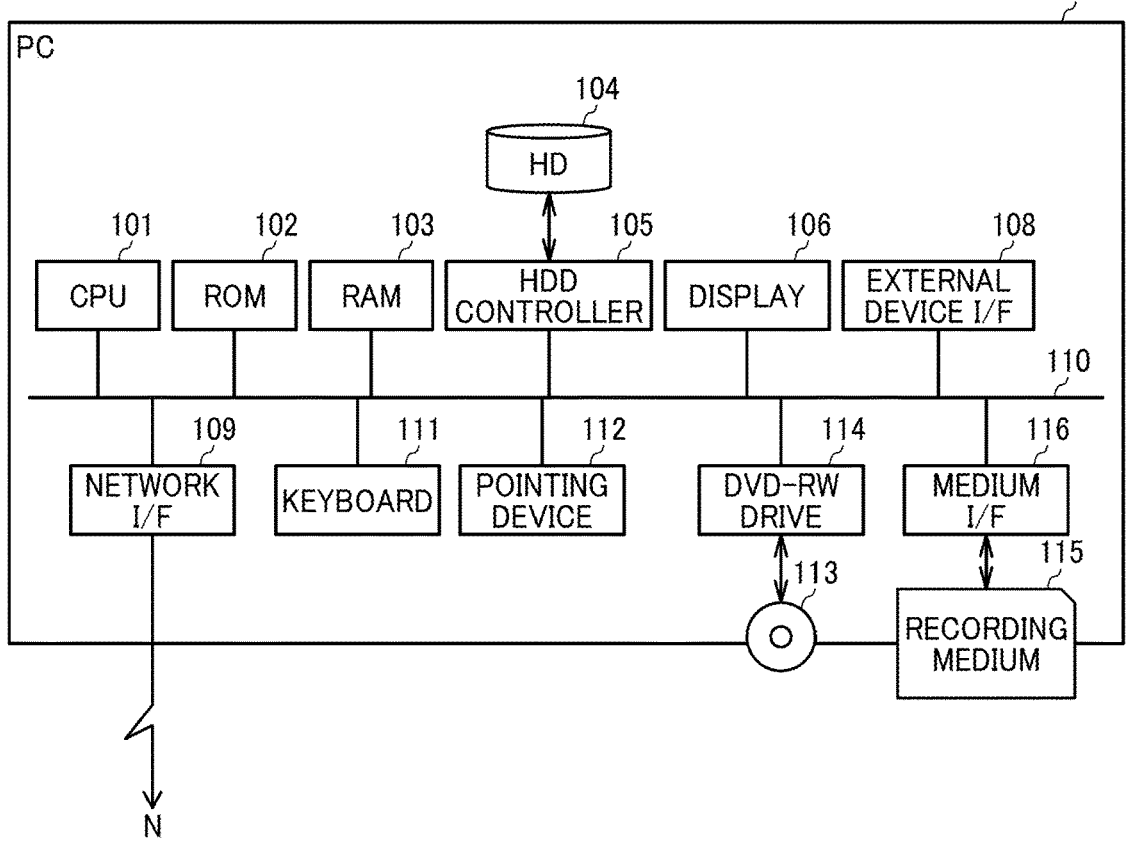
FIG. 3 is a block diagram illustrating an example of a hardware configuration of one of personal computers that are examples of the image processing apparatuses illustrated in FIG. 1.

FIG. 3 is a block diagram illustrating an example of a hardware configuration of one of personal computers that are examples of the image processing apparatuses illustrated in FIG. 1. A description is now given of the hardware configuration of the personal computer.

As illustrated in FIG. 3, each of the PCs 80 and 90 includes a CPU 101, a ROM 102, a RAM 103, an HD 104, an HDD controller 105, a display 106, an external device I/F 108, a network I/F 109, a data bus 110, a keyboard 111, a pointing device 112, a digital versatile disc rewritable (DVD-RW) drive 114, and a medium I/F 116.

The CPU 101 controls entire operation of one of the PCs 80 and 90 to which the CPU 101 belongs. The ROM 102 stores a program such as an initial program loader (IPL) used for driving the CPU 101. The RAM 103 is used as a work area for the CPU 101. The HD 104 stores various data such as a program. The HDD controller 105 controls reading and writing of various data from and to the HD 104 under control of the CPU 101.

The display 106 displays various information such as a cursor, a menu, a window, characters, and images. The external device I/F 108 is an interface for connection with various external devices. Examples of the external devices include, but not limited to, a USB memory and a printer. The network I/F 109 is an interface for data communication through the network N. The data bus 110 is an address bus, a data bus, or the like that electrically connects each component illustrated in FIG. 3 such as the CPU 101.

The keyboard 111 is an example of an input device including a plurality of keys for inputting characters, numerical values, various instructions, and the like. The pointing device 112 is an example of an input device that allows a user to select or execute various instructions, select an object for processing, and move a cursor being displayed. The DVD-RW drive 114 controls reading and writing of various data from and to a DVD-RW 113, which is an example of a removable storage medium. The removable storage medium is not limited to the DVD-RW and may be a digital versatile disc-recordable (DVD-R) or the like. The medium I/F 116 controls reading and writing (storing) of data from and to a recording medium 115 such as a flash memory.

Issue in Determination Processing of Erecting Direction

Figure 6A:
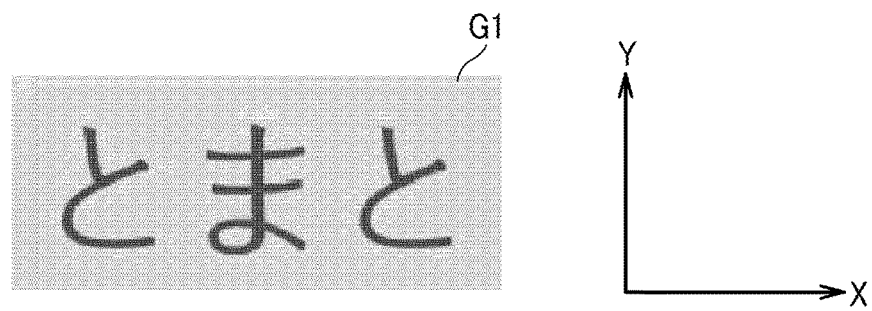
FIGS. 6A to 6E are schematic diagrams illustrating images to be processed by one of the image processing apparatuses according to each embodiment of the present disclosure.

A description is now given of an issue in determination processing of an erecting direction with reference to FIGS. 6A to 6E. FIGS. 6A to 6E are schematic diagrams illustrating images to be processed by one of the image processing apparatuses according to each embodiment of the present disclosure. Although Japanese characters are used in FIGS. 6A to 6E, other characters such as English characters can be used. In FIG. 6A, directions are defined as follows and the definition of the directions also applies to FIGS. 6B to 6E. A direction indicated by an arrow X in the X direction is referred to as a +X direction and a direction opposite to the +X direction is referred to as a −X direction. A direction indicated by an arrow Y in the Y direction is referred to as a +Y direction and a direction opposite to the +Y direction is referred to as a −Y direction. In some cases, the X-axis direction may be referred to as a horizontal direction and the Y-axis direction may be referred to as a vertical direction.

Image data obtained by scanning a paper surface of a document with the scanner engine 31 is multivalued image data represented by an image G1 illustrated in FIG. 6A.

Figure 6B:

For performing the OCR processing, the multivalued image data of the scanned document represented by the image G1 illustrated in FIG. 6A is binarized with a certain threshold value to obtain binary image data represented by an image G2 illustrated in FIG. 6B.

Figure 6C:
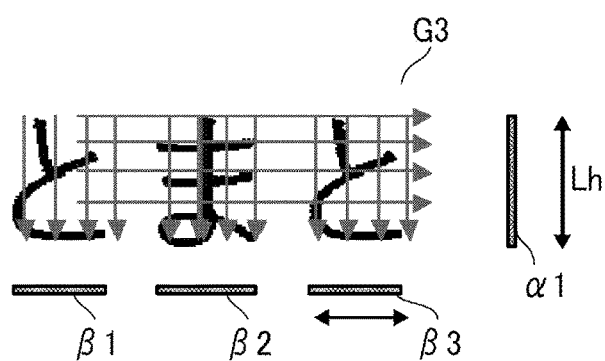

Thereafter, as illustrated in FIG. 6C, a rectangular area of an image considered to be a character (a character image) is usually extracted by performing orthogonal projection in the vertical direction (Y direction) and the horizontal direction (X direction) with respect to the binary image data represented by the image G2.

Figure 6D:
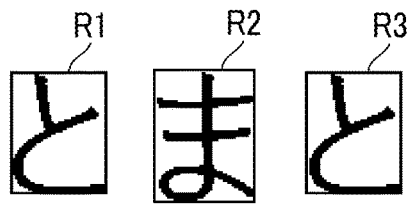

As indicated in an image G3 of FIG. 6C, by performing the orthogonal projection in the horizontal direction (X direction) with respect to the binary image data represented by the image G2, a height Lh (a line segment α1) is obtained, to perform text-line segmentation in the horizontal direction (X direction) with respect to the binary image data represented by the image G2. Further, by performing the orthogonal projection in the vertical direction (Y direction) with respect to the binary image data represented by the image G2, widths of text columns (line segments β1, β2, and β3) are obtained. As illustrated in FIG. 6D, a rectangular area of a character image is determined by performing the orthogonal projection in the horizontal direction with respect to the character image, and thus rectangular areas of character images R1, R2, and R3 are segmented.

Figure 6E:
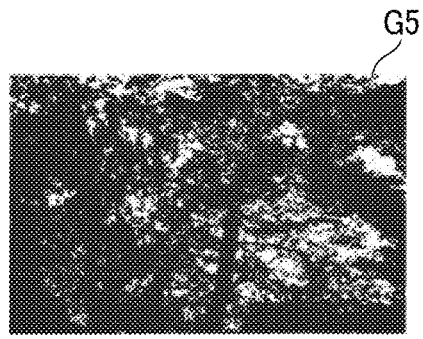

It is often assumed that a rectangular area, such as an image G5 illustrated in FIG. 6E, that has an excessively long physical length is not a character image but, for example, a photographic image. Based on such an assumption, upper limit values for the vertical and horizontal sizes of a character image are set in performing the OCR processing.

This setting (setting of the upper limit values for the vertical and horizontal sizes) is widely effective in preventing erroneous recognition to forcibly recognize a photographic image to be one character, for correctly recognizing the photographic image not to be a character.

However, in some cases, erroneous recognition cannot be prevented.

One of the cases is where a document contains only unexpectedly large characters.

For example, there is a case where only very large characters are used on a slide of a presentation document.

In such a case, when the OCR processing is performed on an assumption of an ordinary character size, an image whose vertical or horizontal size exceeds the upper limit value for the vertical or horizontal size of a rectangular area of a character image may be rejected, resulting in a failure in performing the OCR processing.

In a case where only large characters are used in a document, the number of characters included in the document is small. Accordingly, even if the OCR processing results in a failure, the impact may be considered to be small. That is, higher priority may be given to an effect of preventing erroneous recognition to forcibly recognize a photographic image to be one character.

However, in a case where the OCR processing is performed not for a purpose of the character recognition but for a purpose of the determination processing of the erecting direction, as a result of the large characters being rejected in the OCR processing, the top-bottom of the document may not be determined (is undetermined). In the case where the top-bottom of the document is undetermined, a direction in an initial state is assumed to be the erecting direction. However, in a case where the assumption is wrong, the wrong assumption causes a serious disadvantage that a result of the OCR processing of the entire document is wrong. This disadvantage is incomparable with the above-described erroneous recognition of the photographic image to be one character.

That is, in a case where the OCR processing is performed for the purpose of the determination of the erecting direction, it may be better to change the upper limit values for the vertical and horizontal sizes of the rectangular area of a character set based on the assumption of the ordinary character size.

Further, in a case where a high degree of certainty of a result of the OCR processing is obtained using the upper limit values for the vertical and horizontal sizes of the rectangular area of a character image changed for performing the determination processing of the erecting direction, it is highly probable that the document includes large characters. Accordingly, it is preferable to change the upper limit values for the vertical and horizontal sizes of the rectangular area of a character image set based on the assumption of the ordinary character size also in a case where the OCR processing is performed on character images of an entire page of the document after performing the determination processing of the erecting direction.

That is, the OCR processing is performed according to the following procedure. Character images on a page of a document are sampled and the OCR processing is performed on the sampled character images in the +X direction, the −X direction, the +Y direction, and the −Y direction with respect to the page of the document to calculate a degree of certainty of each direction. A direction having the highest degree of certainty among the degree of certainty of the four directions is determined to be an erecting direction. Thus, the erecting direction of the page of the document is determined. Then, the OCR processing is performed on all the character images on the page of the document along the erecting direction.

In performing the OCR processing on the entire page of the document, upper limit values are set for the vertical and horizontal sizes of a rectangular area of a character image to increase character recognition accuracy. It is necessary to change the upper limit values for the vertical and horizontal sizes of the rectangular area of a character image depending on a purpose (even in performing the same OCR processing).

Functional Configuration of Image Processing Apparatus

Figure 4:
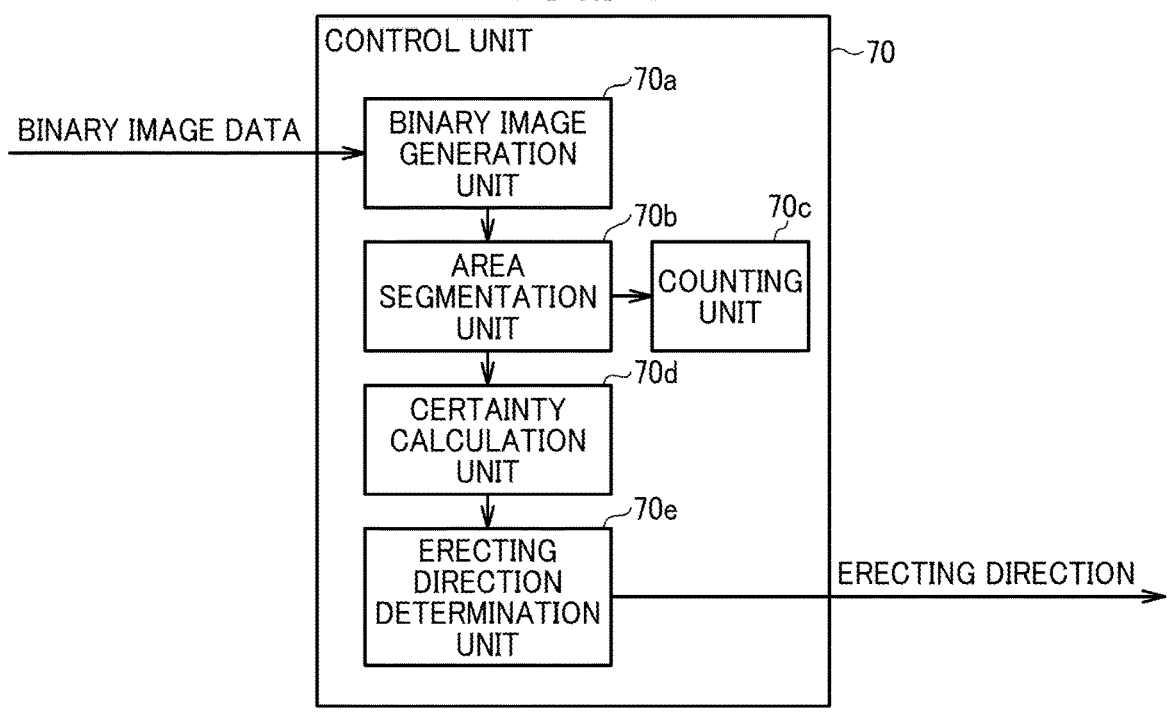
FIG. 4 is a block diagram illustrating an example of a functional configuration of one of the image processing apparatuses according to embodiments of the present disclosure.

FIG. 4 is a block diagram illustrating an example of a functional configuration of one of the image processing apparatuses according to the present embodiment.

The image processing apparatus is implemented, for example, by installing a program for executing the processing described below in the HD 104 of the PC 80 or 90 illustrated in FIG. 3 in advance and executing the program read by the CPU 101 of the PC 80 or 90 to which the HD 104 belongs from the HD 104.

Alternatively, the image processing apparatus may be implemented by installing the program for executing the processing described below in the HD 29 of the image forming apparatus 10 illustrated in FIG. 2 in advance and executing the program read by the CPU 25a from the HD 29.

As illustrated in FIG. 4, the image processing apparatus includes a control unit 70 that includes a binary image generation unit 70a, an area segmentation unit 70b, a counting unit 70c, a certainty calculation unit 70d, and an erecting direction determination unit 70e.

The image processing apparatus determines an erecting direction of a character image included in image data and performs an ordinary character recognition along the erecting direction.

The binary image generation unit 70a binarizes multivalued image data obtained by reading a document with the scanner engine 31 with a certain threshold to generate binary image data.

The binary image generation unit 70a loads the binary image data in a first work area of the RAM 22b.

The area segmentation unit 70b sets upper limit values for the vertical and horizontal sizes of a character image (one character image) included in the binary image data and segments the binary image data in units of character images, that is, into rectangular areas (hereinafter also "character image rectangular areas") each satisfying the upper limit values for the vertical and horizontal sizes. The upper limit values may be defined by a designer or a manufacturer.

A description is given of the counting unit 70c later.

The certainty calculation unit 70d performs the character recognition on the character images in the rectangular areas in the +X direction, the −X direction, the +Y direction, and the −Y direction to calculate degrees of certainty of the four directions in units of character images.

The erecting direction determination unit 70e determines a direction having the highest degree of certainty among the degrees of certainty of the four directions calculated by the certainty calculation unit 70d to be an erecting direction.

In a case where the erecting direction determination unit 70e determines the erecting direction, the control unit 70 increases the upper limit values for the vertical and horizontal sizes to be set in the area segmentation unit 70b to be larger than the upper limit values for the vertical and horizontal sizes in performing the ordinary character recognition.

In a case where actual values of the vertical and horizontal sizes of each character image do not exceed the upper limit values for the vertical and horizontal sizes and the determination processing of the erecting direction performed by the erecting direction determination unit 70e results in being undetermined, the control unit 70 increases the upper limit values for the vertical and horizontal sizes.

The counting unit 70c counts the number of character images whose actual values of the vertical or horizontal sizes do not exceed the upper limit value in a row or a column of the rectangular areas segmented by the area segmentation unit 70b.

In a case where the number of character images counted by the counting unit 70c is equal to or smaller than a reference value in a row or a column, the control unit 70 increases the upper limit values for the vertical and horizontal sizes.

The counting unit 70c counts the number of character images adjacent to each other in a row or a column out of the character images whose actual values for the vertical or horizontal size exceed the upper limit value for the vertical or horizontal size among the character image rectangular areas segmented by the area segmentation unit 70b.

In a case where the number of character images adjacent to each other counted by the counting unit 70c is two or more in a row or a column for the first time, the control unit 70 increases the upper limit values for the vertical and horizontal sizes.

In a case where the number of character images counted by the counting unit 70c is more than a half of a total number of the character images in the same row or the same column, the control unit 70 increases the upper limit values for the vertical and horizontal sizes.

The control unit 70 extracts the character images whose actual values of the vertical or horizontal sizes exceed the upper limit value for the vertical or horizontal size. In a case where the extracted character images exist in adjacent two rows or adjacent two columns, the control unit 70 controls the upper limit values for the horizontal and vertical sizes to be taken over.

The certainty calculation unit 70d performs the character recognition on the character images in the rectangular areas in at least two directions out of the +X direction, the −X direction, the +Y direction, and the −Y direction to calculate degrees of certainty of the two directions in units of character images.

The erecting direction determination unit 70e determines a direction having the degree of certainty calculated by the certainty calculation unit 70d larger than a predetermined threshold value of the degree of certainty and the degree of certainty of the other direction calculated by the certainty calculation unit 70d to be an erecting direction. The predetermined threshold value of the degree of certainty is, for example, defined by a designer or a manufacturer.

When having increased the upper limit values for the vertical and horizontal sizes, the control unit 70 increases the predetermined threshold value of the degree of certainty.

In a case where at least one of the degrees of certainty of the four directions calculated by the certainty calculation unit 70d exceeds a first threshold value of the degree of certainty, the erecting direction determination unit 70e accumulates only the highest of the degrees of certainty of the four directions in units of character images and divides the accumulated degree of certainty of each direction by the total number of accumulations for the four directions. In a case where one of the divided degrees of certainty of the four directions exceeds a second threshold value of the degree of certainty that is different from the first threshold value of the degree of certainty, the erecting direction determination unit 70e determines the direction whose divided degree of certainty exceeds the second threshold value of the degree of certainty to be the erecting direction.

In a case where the erecting direction determination unit 70e has determined the erecting direction, the control unit 70 increases the upper limit values for the vertical and horizontal sizes to be set in the area segmentation unit 70b to be larger than the upper limit values for the vertical and horizontal sizes used in the ordinary character recognition. In such a case, the control unit 70 determines the upper limit values for the vertical and horizontal sizes of a character image rectangular area to be used in the ordinary character recognition based on the increased upper limit values for the vertical and horizontal sizes.

Each function of the embodiments described above may be implemented by one processing circuit or a plurality of processing circuits. Here, the "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

First Embodiment

Figure 5:
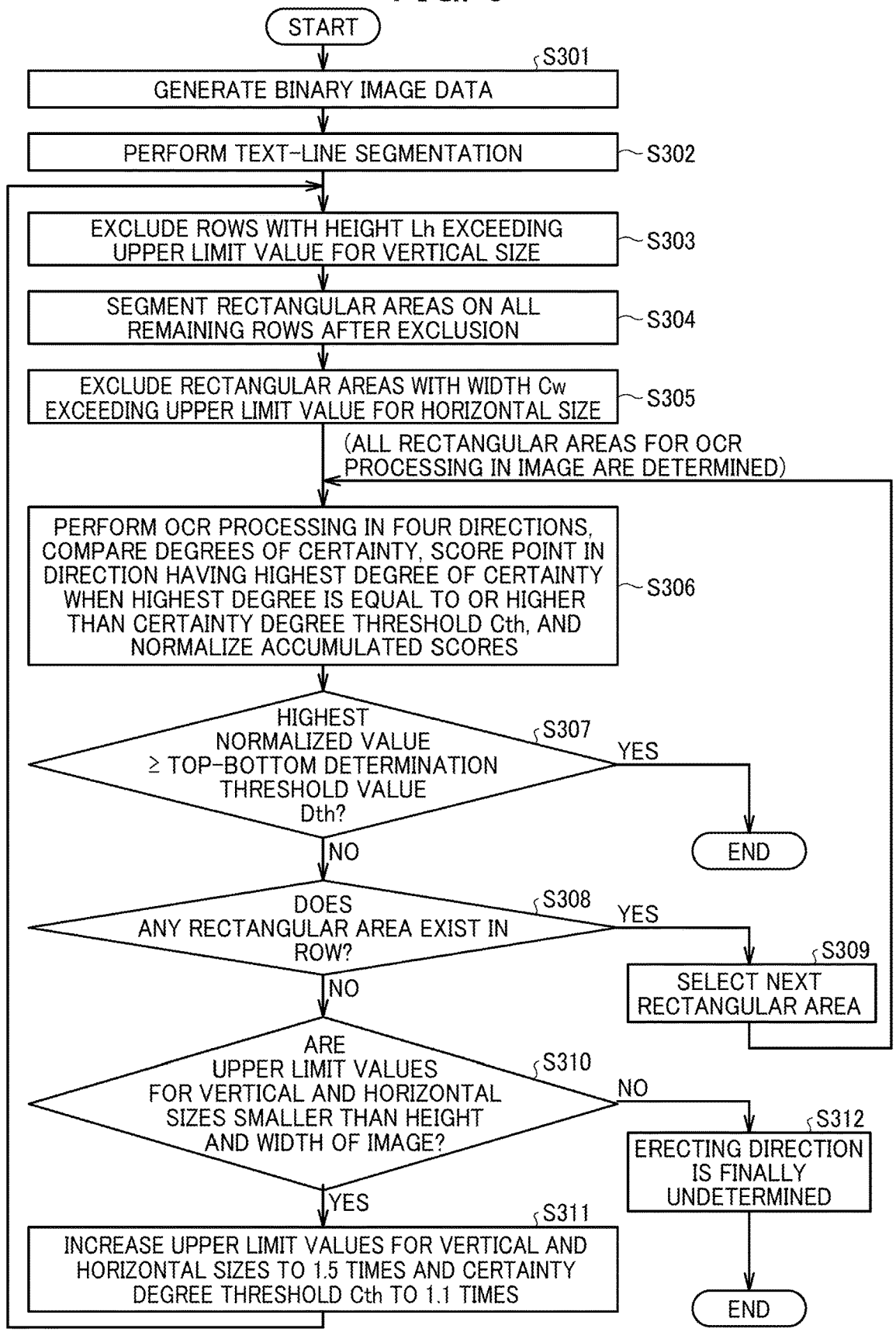
FIG. 5 is a flowchart illustrating processing performed by one of the image processing apparatuses according to a first embodiment of the present disclosure.

FIG. 5 is a flowchart illustrating processing performed by one of the image processing apparatuses according to a first embodiment of the present disclosure. The processing of S307 to S311 in FIG. 5 is performed repeatedly for redetermination in a case where the erecting direction remains undetermined.

The binary image generation unit 70a generates binary image data in S301. Note that the image data obtained by reading the document with the scanner engine 31 is multivalued image data represented by the image G1 illustrated in FIG. 6A. The binary image generation unit 70a binarizes the multivalued image data with a certain threshold to generate the binary image data and loads the binary image data in the first work area of the RAM 22b.

In S302, the area segmentation unit 70b performs text-line segmentation on the image data loaded in the first work area of the RAM 22b and stores the segmented images of the rows in a second work area of the RAM 22b.

In S303, the area segmentation unit 70b excludes rows whose heights Lh exceed the upper limit value for the vertical size from the segmented images of the rows in the second work area of the RAM 22b.

In S304, the area segmentation unit 70b segments, into rectangular areas in units of character images, all the remaining rows after exclusion in the second work area of the RAM 22b and stores the segmented images of the character image rectangular areas in a third work area of the RAM 22b.

In S305, the area segmentation unit 70b excludes character image rectangular areas whose widths CW exceed the upper limit value for the horizontal size in the third work area of the RAM 22b. Through S301 to S305, all the rectangular areas of character images included in the binary image data on which OCR processing is to be performed are determined and stored in the third work area of the RAM 22b.

In S303 to S305, the area segmentation unit 70b sets the upper limit values for the vertical and horizontal sizes for a character image and segments the binary image data into character image rectangular areas satisfying the upper limit values for the vertical and horizontal sizes.

Segmentation of Binary Image Data into Rectangular Areas

A description is now given of segmentation of the binary image data into rectangular areas in S301 to S305.

The image G1 in FIG. 6A is an example of an image representing the multivalued image data.

The image G2 in FIG. 6B is an example of an image representing the binary image data. The binary image data is generated by binarizing the multivalued image data with a certain threshold value.

As illustrated in FIG. 6C, by performing the orthogonal projection in the horizontal direction (X direction) with respect to the image G2, the line segment $\alpha 1$ is determined to perform the text-line segmentation for a row where the line segment $\alpha 1$ exists. In the example illustrated in FIG. 6C, the length of the line segment $\alpha 1$ corresponds to the height of the image R2 of FIG. 6D, which is the height Lh of the row in the present embodiment. In other words, the height Lh of a row is the highest of heights of character images in the row.

Further, by performing the orthogonal projection in the vertical direction (Y direction) with respect to the image G2 of FIG. 6B as illustrated in FIG. 6C, the line segments $\beta 1$, $\beta 2$, and $\beta 3$ are determined to segment the row into the rectangular areas of the character images R1, R2, and R3 as illustrated in FIG. 6D. Thereafter, the height of each character image is determined by performing the orthogonal projection in the horizontal direction (X direction) with respect to the image G2 again.

Returning to FIG. 5, the description of the determination processing of the erecting direction is continued. The certainty calculation unit 70d performs the character recognition on the character images in the rectangular areas in the +X direction, the −X direction, the +Y direction, and the −Y direction to calculate degrees of certainty of the four directions in units of character images.

In S306, the erecting direction determination unit 70e compares the degrees of certainty of the four directions in units of character images. In a case where the highest of the degrees of certainty of the four directions is equal to or greater than a predetermined certainty degree threshold $C_{th}=0.8$, one point is scored in the direction having the highest degree of certainty and an accumulated score of each of the four directions is divided by the total number of accumulations of the four directions to normalize the sum of the divided scores of the four directions to be 1.

TABLE

| DIRECTION | SCORE | NORMALIZED VALUE |
|---|---|---|
| +X DIRECTION | | |
| −X DIRECTION | | |
| +Y DIRECTION | | |
| −Y DIRECTION | | |

The degree of certainty here is an index value indicating to what degree a recognized character is probable, and is represented by a numerical value of 0 to one 1. Typically, a feature value is extracted after normalizing the number of pixels of each segmented character image, and matching processing is performed between a feature value and a pattern dictionary to convert a degree of similarity (a Euclidean distance or a Mahalanobis distance) into the numerical value of 0 to 1.

In S307, in a case where the sum of the accumulated scores of the four directions is at least three points, the erecting direction determination unit 70e compares the highest of the normalized values of the four directions with a top-bottom determination threshold value Dth=0.85. In a case where the highest normalized value is equal to or greater than the top-bottom determination threshold value Dth (YES in S307), the erecting direction determination unit 70e determines a direction having the highest normalized value to be an erecting direction, and the determination processing of the erecting direction ends.

Here, at least as initial values, the certainty degree threshold Cth is smaller than the top-bottom determination threshold value Dth (Cth<Dth).

The degree of certainty of only one character image is insufficient in reliability for character recognition. On the other hand, an extremely high degree of certainty is reliable for character recognition. By setting the threshold value (the top-bottom determination threshold value) for the normalized value of the degree of certainty calculated with a plurality of character images greater than the threshold value of the degree of certainty calculated with one character image, the accuracy of the determination processing of the erecting direction is secured.

On the other hand, in a case where the highest normalized value is smaller than the top-bottom determination threshold value Dth (NO in S307), the erecting direction determination unit 70e determines whether a character image rectangular area on which the character recognition has not been performed exists in the row in S308.

In a case where a character image rectangular area on which the character recognition has not been performed exists in the row (YES in S308), the erecting direction determination unit 70e selects the next character image rectangular area in S309 and repeats the processing from S306. The next character image rectangular area is selected sequentially from top left to bottom right (in an order of raster scanning).

In a case where the sum of the accumulated scores of the four directions is smaller than three points or the highest normalized value is smaller than the top-bottom determination threshold value Dth after the character recognition is performed on the character images in the rectangular areas whose heights Lh do not exceed the upper limit value for the vertical size in all the rows (NO in S307), the determination result of the erecting direction indicates being undetermined. Further, in a case where a character image rectangular area on which the character recognition has not been performed does not exist, that is, there is an excluded row or an excluded rectangular area (NO in S308), the process proceeds to S310.

In S310, the area segmentation unit 70b determines whether the upper limit values for the vertical and horizontal sizes are smaller than the vertical and horizontal sizes of an image representing the binary image data loaded in the first work area of the RAM 22b.

In a case where the area segmentation unit 70b determines that the upper limit values for the vertical and horizontal sizes are smaller than the vertical and horizontal sizes of an image representing the binary image data loaded in the first work area of the RAM 22b (YES in S310), the process proceeds to S311. In S311, the control unit 70 increases the upper limit values for the vertical and horizontal sizes to 1.5 times of the respective current values to newly set the upper limit values for the vertical and horizontal sizes and the certainty degree threshold Cth to 1.1 times of the current value to newly set the threshold value Cth of the degree of certainty to be qualified to score one point. Note that the upper limit value for the newly set certainty degree threshold Cth is set to 1. Then, the process returns to S303 and the area segmentation unit 70b repeats the processing from S303.

Accordingly, since a character image rectangular area whose vertical or horizontal size is larger than the vertical or horizontal size of a character initially assumed is included in the targets for scoring, the number of cases in which the erecting direction is not determined is reduced. Consequently, the accuracy of the determination processing of the erecting direction increases.

In addition, the upper limit values for the vertical and horizontal sizes of the character image rectangular area are increased for the first time in a case where the determination processing of the erecting direction results in being undetermined. That is, the character recognition is not affected in a case where the character image rectangular area whose vertical and horizontal sizes are within the vertical and horizontal sizes of a character initially assumed. Thus, adaptive processing is performed only in a case where the character image rectangular area whose vertical or horizontal size is larger than the vertical or horizontal size of a character initially assumed.

Note that, in a case where the certainty degree threshold Cth is increased to 1.1 times of the current value, the top-bottom determination threshold value Dth may also be increase to 1.05 times of the respective current value, for example, to maintain the relationship in which the certainty degree threshold Cth is smaller than the top-bottom determination threshold value Dth as much as possible.

On the other hand, in a case where area segmentation unit 70b determines that the upper limit values for the vertical and horizontal sizes are not smaller than the vertical and horizontal sizes of an image representing the binary image data loaded in the first work area of the RAM 22b (NO in S310), the erecting direction determination unit 70e finally determines that the erecting direction is undetermined in S312.

In addition, in the present embodiment, since a character image rectangular area whose vertical or horizontal size is larger than the vertical or horizontal size of a character initially assumed is included in the targets for scoring, the certainty degree threshold Cth is increased accordingly. Thus, a disadvantage to include a rectangular area that is actually a rectangular area of a photographic image in the targets for scoring is prevented. The rectangular area that is actually a rectangular area of a photographic image originally does not look like a character image rectangular area and is estimated to have a lower degree of certainty than a degree of certainty of a rectangular area of actually a character image. As a result, the upper limit values for the vertical and horizontal sizes of a character image rectangular area can be increased in a state in which the above-described disadvantage is reduced. Consequently, the accuracy of the determination processing of the erecting direction increases.

Second Embodiment

FIG. 7 is a flowchart illustrating processing performed by one of the image processing apparatuses according to a second embodiment of the present disclosure. The processing of S405 to S412 in FIG. 7 is performed repeatedly for redetermination in a case where the number of rectangular areas in a row is insufficient.

The binary image generation unit 70a generates binary image data in S401. Note that the image data obtained by reading the document with the scanner engine 31 is multi-valued image data represented by the image G1 as illustrated in FIG. 6A. The binary image generation unit 70a binarizes the multivalued image data with the certain threshold value to generate the binary image data and loads the binary image data in the first work area of the RAM 22b.

In S402, the area segmentation unit 70b performs text-line segmentation on the image data loaded in the first work area of the RAM 22b and stores the segmented images of the rows in the second work area of the RAM 22b.

In S403, the area segmentation unit 70b initializes the upper limit values for the vertical and horizontal sizes for a character image rectangular area and the certainty degree threshold Cth. In FIG. 5, the upper limit value for the vertical size is applied to the height of a row obtained as described with reference to FIG. 6C. Alternatively, the height of each character may be obtained as described above, and the upper limit value for the vertical size may be applied to the height of the character.

In S404, the area segmentation unit 70b excludes rectangular areas whose vertical or horizontal sizes exceed the upper limit value for the vertical or horizontal size in units of rows in the second work area of the RAM 22b to determine all character image rectangular areas on which character recognition is to be performed in each row, and stores images of the determined rectangular areas in the third work area of the RAM 22b.

In S405, the area segmentation unit 70b determines whether the number of character image rectangular areas on which character recognition is to be performed in the row is smaller than a predetermined value. The predetermined value is, for example, defined by a designer or a manufacturer. In a case where the number of character image rectangular areas on which character recognition is to be performed in the row is not smaller than the predetermined value (NO in S405), the process proceeds to S408. On the other hand, in a case where the number of character image rectangular areas on which character recognition is to be performed in the row is smaller than the predetermined value (YES in S405), the process proceeds to S406.

In S406, the area segmentation unit 70b determines the upper limit values for the vertical and horizontal sizes are smaller than respective halves of the vertical and horizontal sizes of an image representing the binary image data loaded in the first work area of the RAM 22b. In a case where the area segmentation unit 70b determines that the upper limit values for the vertical and horizontal sizes are not smaller than the respective halves of the vertical and horizontal sizes of an image representing the binary image data loaded in the first work area of the RAM 22b (NO in S406), the process proceeds to S408. On the other hand, in a case where the area segmentation unit 70b determines that the upper limit values for the vertical and horizontal sizes are smaller than the respective halves of the vertical and horizontal sizes of an image representing the binary image data loaded in the first work area of the RAM 22b (YES in S406), the process proceeds to S407.

In S407, the area segmentation unit 70b newly sets the upper limit values for the vertical and horizontal sizes to be increased to 1.5 times of the respective current values and the certainty degree threshold Cth to 1.1 times of the current value.

As described above, in a case where the number of character image rectangular areas on which character recognition is to be performed in a row is counted in advance and the number of character image rectangular areas is insufficient in the row, the upper limit values for the vertical and horizontal sizes for the character image rectangular area are increased. Thus, the number of cases in which a sufficient number of rectangular areas is obtained for performing the determination processing of the erecting direction increases and the number of cases in which the erecting direction is not determined decreases. Consequently, the accuracy of the determination processing of the erecting direction increases.

The certainty calculation unit 70d performs the character recognition on the character images in the rectangular areas in the +X direction, the −X direction, the +Y direction, and the −Y direction to calculate degrees of certainty of the four directions in units of character images.

In S408, the erecting direction determination unit 70e compares the degrees of certainty of the four directions. In a case where the highest of the degrees of certainty of the four directions is equal to or greater than the predetermined certainty degree threshold Cth=0.8, one point is scored in the direction having the highest degree of certainty and an accumulated score of each of the four directions is divided by the total number of accumulations of the four directions to normalize the sum of the divided score of the four directions to be 1.

In S409, in a case where the sum of the accumulated scores of the four directions is at least three points, the erecting direction determination unit 70e compares the highest of the normalized values of the four directions with the top-bottom determination threshold value Dth=0.85. In a case where the highest normalized value is equal to or greater than the top-bottom determination threshold value Dth (YES in S409), the erecting direction determination unit 70e determines the direction having the highest normalized value to be the erecting direction, and the determination processing of the erecting direction ends.

On the other hand, in a case where the highest normalized value is smaller than the top-bottom determination threshold value Dth (NO in S409), the erecting direction determination unit 70e determines whether any other character image rectangular area on which the character recognition has not been performed exists in the row in S410.

In a case where another character image rectangular area on which the character recognition has not been performed exists in the row (YES in S410), the erecting direction determination unit 70e selects the next character image rectangular area in S411 and repeats the processing from S408. The next character image rectangular area is selected sequentially from top left to bottom right (in an order of raster scanning).

In a case where no other character image rectangular area on which the character recognition has not been performed exists in the row (NO in S410), the erecting direction determination unit 70e determines whether any other row exists in the binary image data in S412. In a case where the erecting direction determination unit 70e determines that another row exists in the binary image data (YES in S412), the process proceeds to S404.

Accordingly, the increased upper limit values for the vertical and horizontal sizes are taken over for performing the character recognition on character images in the next row.

By not initializing but taking over the increased upper limit values for the vertical and horizontal sizes used in performing the character recognition on the character images in the row for performing the character recognition on the character images in the next row, the upper limit values for the vertical and horizontal sizes are increased efficiently.

On the other hand, in a case where the erecting direction determination unit 70e determines that no other row exists in the binary image data (NO in S412), the erecting direction determination unit 70e finally determines that the erecting direction is undetermined in S413.

Third Embodiment

FIG. 8 is a flowchart illustrating processing performed by one of the image processing apparatuses according to a third embodiment of the present disclosure. The processing of S505 to S512 in FIG. 8 is performed repeatedly for redetermination in a case where character image rectangular areas adjacent to each other are excluded in a row.

The binary image generation unit 70a generates binary image data in S501. Note that the image data obtained by reading the document with the scanner engine 31 is multivalued image data represented by the image G1 as illustrated in FIG. 6A. The binary image generation unit 70a binarizes the multivalued image data with the certain threshold value to generate the binary image data and loads the binary image data in the first work area of the RAM 22b.

In S502, the area segmentation unit 70b performs text-line segmentation on the image data loaded in the first work area of the RAM 22b and stores the segmented images of the rows in the second work area of the RAM 22b.

In S503, the area segmentation unit 70b initializes the upper limit values for the vertical and horizontal sizes of a character image rectangular area and the certainty degree threshold Cth.

In S504, the area segmentation unit 70b excludes rectangular areas whose vertical or horizontal size exceed the upper limit value for the vertical or horizontal size in units of rows in the second work area of the RAM 22b to determine all rectangular areas of a character image on which OCR processing is to be performed in each row, and stores images of the determined rectangular areas in the third work area of the RAM 22b.

In S505, the area segmentation unit 70b determines whether character image rectangular areas adjacent to each other are excluded in the row. In a case where no character image rectangular areas adjacent to each other are excluded in the row (NO in S505), the process proceeds to S508. On the other hand, in a case where both of the character image rectangular areas adjacent to each other are excluded in the row (YES in S508), the process proceeds to S506.

In S506, the area segmentation unit 70b determines whether the upper limit values for the vertical and horizontal sizes are smaller than respective halves of the vertical and horizontal sizes of an image representing the binary image data loaded in the first work area of the RAM 22b. In a case where the area segmentation unit 70b determines that the upper limit values for the vertical and horizontal sizes are not smaller than the respective halves of the vertical and horizontal sizes of an image representing the binary image data loaded in the first work area of the RAM 22b (NO in S506), the process proceeds to S508. On the other hand, in a case where the area segmentation unit 70b determines that the upper limit values for the vertical and horizontal sizes are smaller than the respective halves of the vertical and horizontal sizes of an image representing the binary image data loaded in the first work area of the RAM 22b (YES in S506), the process proceeds to S507.

In S507, the area segmentation unit 70b newly sets the upper limit values for the vertical and horizontal sizes to 1.5 times of the current value and the certainty degree threshold Cth to 1.1 times of the current value.

In a case where both of the character image rectangular areas adjacent to each other are excluded in the row as described above, the actual sizes of the character images in the rectangular areas may be larger than the character size initially assumed. Then, the upper limit values for the vertical and horizontal sizes of a character image rectangular area are increased. Thus, the number of cases in which a sufficient number of rectangular areas of a character image is obtained for performing the determination processing of the erecting direction increases and the number of cases in which the erecting direction is not determined decreases. Consequently, the accuracy of the determination processing of the erecting direction increases.

The certainty calculation unit 70d performs the character recognition on the character images in the rectangular areas in the +X direction, the −X direction, the +Y direction, and the −Y direction to calculate degrees of certainty of the four directions in units of character images.

In S508, the erecting direction determination unit 70e compares the degrees of certainty of the four directions. In a case where the highest of the degrees of certainty of the four directions is equal to or greater than the predetermined certainty degree threshold Cth=0.8, one point is scored in the direction having the highest degree of certainty and an accumulated score of each of the four directions is divided by the total number of accumulations of the four directions to normalize the sum of the divided score of the four directions to be 1.

In S509, in a case where the sum of the accumulated scores of the four directions is at least three points, the erecting direction determination unit 70e compares the highest of the normalized values of the four directions with the top-bottom determination threshold value Dth=0.85. In a case where the highest normalized value is equal to or greater than the top-bottom determination threshold value Dth (YES in S509), the erecting direction determination unit 70e determines the direction having the highest normalized value to be an erecting direction, and the determination processing of the erecting direction ends.

On the other hand, in a case where the highest normalized value is smaller than the top-bottom determination threshold value Dth (NO in S509), the erecting direction determination unit 70e determines whether any other character image rectangular area on which the character recognition has not been performed exists in the row in S510.

In a case where another character image rectangular area on which the character recognition has not been performed exists in the row (YES in S510), the erecting direction determination unit 70e selects the next character image rectangular area in S511 and repeats the processing from S508. The next character image rectangular area is selected sequentially from top left to bottom right (in an order of raster scanning).

In a case where no other character image rectangular area on which the character recognition has not been performed exists in the row (NO in S510), the erecting direction determination unit 70e determines whether any other row exists in the binary image data in S512. In a case where the erecting direction determination unit 70e determines that another row exists in the binary image data (YES in S512), the process proceeds to S504.

Accordingly, the increased upper limit values for the vertical and horizontal sizes are taken over for performing the character recognition on character images in the next row.

By not initializing but taking over the increased upper limit values for the vertical and horizontal sizes used in performing the character recognition on the character images in the row for performing the character recognition on the character images in the next row, the upper limit values for the vertical and horizontal sizes are increased efficiently.

On the other hand, in a case where the erecting direction determination unit 70e determines that no other row exists in the binary image data (NO in S512), the erecting direction determination unit 70e finally determines that the erecting direction is undetermined in S513.

In a case where both of character image rectangular areas adjacent to each other are excluded in the row in S505, the actual sizes of the character images in the rectangular areas may be larger than the character size initially assumed. Then, the upper limit values for the vertical and horizontal sizes for a character image rectangular area are increased. Thus, the number of cases in which a sufficient number of rectangular area of a character image is obtained for performing the determination processing of the erecting direction increases and the number of cases in which the determination processing of the erecting direction results in being undetermined decreases. Consequently, the accuracy of the determination processing of the erecting direction increases.

Fourth Embodiment

FIG. 9 is a flowchart illustrating processing performed by one of the image processing apparatuses according to a fourth embodiment of the present disclosure. The processing of S605 to S612 in FIG. 9 is performed repeatedly for redetermination in a case where more than a half of character image rectangular areas are excluded in a row.

The binary image generation unit 70a generates binary image data in S601. Note that the image data obtained by reading the document with the scanner engine 31 is multi-valued image data represented by the image G1 as illustrated in FIG. 6A. The binary image generation unit 70a binarizes the multivalued image data with the certain threshold value to generate the binary image data and loads the binary image data in the first work area of the RAM 22b.

In S602, the area segmentation unit 70b performs text-line segmentation on the image data loaded in the first work area of the RAM 22b and stores the segmented images of the rows in the second work area of the RAM 22b.

In S603, the area segmentation unit 70b initializes the upper limit values for the vertical and horizontal sizes of a character image rectangular area and the certainty degree threshold Cth.

In S604, the area segmentation unit 70b excludes rectangular areas whose vertical or horizontal size exceed the upper limit value for the vertical or horizontal size in units of rows in the second work area of the RAM 22b to determine all character image rectangular areas on which OCR processing is to be performed in each row, and stores images of the determined rectangular areas in the third work area of the RAM 22b.

In S605, the area segmentation unit 70b determines whether more than a half of character image rectangular areas are excluded in a row. In a case where the area segmentation unit 70b does not determine that more than a half of character image rectangular areas are excluded in the row (NO in S605), the process proceeds to S608. On the other hand, in a case where the area segmentation unit 70b determines that more than a half of character image rectangular areas are excluded in the row (YES in S605), the process proceeds to S606.

In S606, the area segmentation unit 70b determines whether the upper limit values for the vertical and horizontal sizes are smaller than respective halves of the vertical and horizontal sizes of an image representing the binary image data loaded in the first work area of the RAM 22b. In a case where the area segmentation unit 70b determines that the upper limit values for the vertical and horizontal sizes are not smaller than respective halves of the vertical and horizontal sizes of an image representing the binary image data loaded in the first work area of the RAM 22b (NO in S606), the process proceeds to S608. On the other hand, in a case where the area segmentation unit 70b determines that the upper limit values for the vertical and horizontal sizes are smaller than respective halves of the vertical and horizontal sizes of an image representing the binary image data loaded in the first work area of the RAM 22b (YES in S606), the process proceeds to S607.

In S607, the area segmentation unit 70b newly sets the upper limit values for the vertical and horizontal sizes to 1.5 times of the respective current values and the certainty degree threshold Cth to 1.1 times of the current value.

As described above, in a case where the number of rectangular areas of a character image on which character recognition is to be performed in a row is counted in advance and the number of rectangular areas of a character image is insufficient in the row, the upper limit values for the vertical and horizontal sizes for the rectangular area of a character image are increased. Thus, the number of cases in which a sufficient number of rectangular areas is obtained for performing the determination processing of the erecting direction increases and the number of cases in which the determination processing of the erecting direction results in being undetermined decreases. Consequently, the accuracy of the determination processing of the erecting direction increases.

The certainty calculation unit 70d performs the character recognition on the character images in the rectangular areas in the +X direction, the −X direction, the +Y direction, and the −Y direction with respect to the character images to calculate degrees of certainty of the four directions in units of character images.

In S608, the erecting direction determination unit 70e compares the degrees of certainty of the four directions. In a case where the highest of the degrees of certainty of the four directions is equal to or greater than a predetermined certainty degree threshold Cth=0.8, one point is scored in the direction having the highest degree of certainty and an accumulated score of each of the four directions is divided by the total number of accumulations of the four directions to normalize the sum of the divided score of the four directions to be 1.

In S609, in a case where the sum of the accumulated scores of the four directions is at least three points or more, the erecting direction determination unit 70e compares the highest normalized value of the normalized values of the four directions with the top-bottom determination threshold value Dth=0.85. In a case where the highest normalized value is equal to or greater than the top-bottom determination threshold value Dth (YES in S609), the erecting direction determination unit 70e determines the direction having the highest normalized value to be the erecting direction, and the determination processing of the erecting direction ends.

On the other hand, in a case where the highest normalized value is smaller than the top-bottom determination threshold value Dth (NO in S609), the erecting direction determination unit 70e determines whether any other rectangular area of a character image on which the character recognition has not been performed exists in the row in S610.

In a case where another rectangular area of a character image on which the character recognition has not been performed exists in the row (YES in S610), the erecting direction determination unit 70e selects the next rectangular area of a character image in S611 and repeats the processing from S608. The next rectangular area of a character image is selected sequentially from top left to bottom right (in an order of raster scanning).

In a case where no other rectangular area of a character image on which the character recognition has not been performed exists in the row (NO in S610), the erecting direction determination unit 70e determines whether any other row exists in the binary image data in S612. In a case where the erecting direction determination unit 70e determines that another row exists in the binary image data (YES in S612), the process proceeds to S604.

Accordingly, the increased upper limit values for the vertical and horizontal sizes are taken over for performing the character recognition on character images in the next row.

By not initializing but taking over the increased upper limit values for the vertical and horizontal sizes used in performing the character recognition on the character images in the row for performing the character recognition on the character images in the next row, the upper limit values for the vertical and horizontal sizes are increased efficiently.

On the other hand, in a case where the erecting direction determination unit 70e determines that no other row exists in the binary image data (NO in S612), the erecting direction determination unit 70e finally determines that the erecting direction is undetermined in S613.

In the fourth embodiment, the area segmentation unit 70b determines whether more than a half of rectangular areas of a character image are excluded in a row (S605). In a case where the area segmentation unit 70b determines that more than a half of rectangular areas of a character image are excluded in the row (YES in S605), the area segmentation unit 70b determines whether the upper limit values for the vertical and horizontal sizes are smaller than respective halves of the vertical and horizontal sizes of an image representing the binary image data loaded in the first work area of the RAM 22b (S606). In a case where the area segmentation unit 70b determines that the upper limit values for the vertical and horizontal sizes are smaller than the respective halves of the vertical and horizontal sizes of an image representing the binary image data loaded in the first work area of the RAM 22b (YES in S606), the control unit 70 increases the upper limit values for the vertical and horizontal sizes to 1.5 times of the respective current values and the certainty degree threshold Cth to 1.1 times of the current value (S607).

In a case where more than a half of rectangular areas of a character image are excluded in a row, it is highly probable that the actual sizes of the character images in the rectangular areas are larger than the character size initially assumed. Then, the upper limit values for the vertical and horizontal sizes for a rectangular area of a character image are increased. Thus, the number of cases in which a sufficient number of rectangular area of a character image is obtained for performing the determination processing of the erecting direction increases and the number of cases in which the determination processing of the erecting direction results in being undetermined decreases. Consequently, the accuracy of the determination processing of the erecting direction increases.

Fifth Embodiment

FIGS. 10A to 10D are flowcharts illustrating processing performed by one of the image processing apparatuses according to a fifth embodiment of the present disclosure. In FIGS. 10A to 10D, OCR processing is performed on an entire image of a page of a document using the upper limit values for the vertical and horizontal sizes of the character image rectangular area used for the determination processing of the erecting direction.

Example of Basic Processing

Figure 10A:
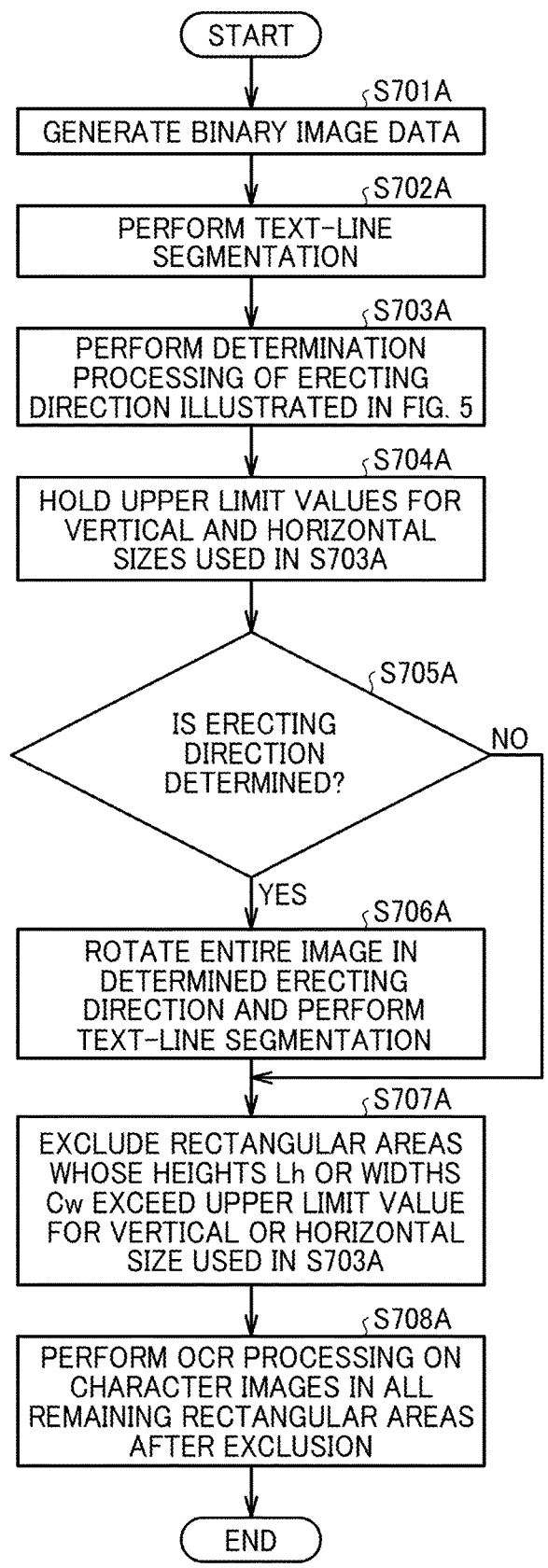

FIG. 10A is a flowchart illustrating an example of basic processing performed by one of the image processing apparatuses according to the fifth embodiment of the present disclosure.

The binary image generation unit 70a generates binary image data in S701A.

In S702A, the area segmentation unit 70b performs textline segmentation on the binary image data.

In S703A, the control unit 70 performs the determination processing of the erecting direction illustrated in FIG. 5.

In S704A, the control unit 70 holds the upper limit values for the vertical and horizontal sizes used for the determination processing of the erecting direction performed in S703A.

In S705A, the erecting direction determination unit 70e determines whether the determination processing of the erecting direction is performed successfully. In a case where the determination processing of the erecting direction is not performed successfully (NO in S705A), the erecting direction determination unit 70e determines that the erecting direction results in being undetermined, and the process proceeds to S707A. On the other hand, in a case where the determination processing of the erecting direction is performed successfully (YES in S705A), the erecting direction determination unit 70e determines that the erecting direction is determined, and the process proceeds to S706A.

In S706A, the entire image is rotated in the determined erecting direction and text-line segmentation is performed on the entire image.

In S707A, the area segmentation unit 70b excludes character image rectangular areas whose heights Lh or widths Cw exceed the upper limit value for the vertical or horizontal size used for the determination processing of the erecting direction performed in S703A. The OCR processing is not performed on the excluded character image rectangular areas.

In S708A, the OCR processing is performed on character images in all the remaining rectangular areas after exclusion.

In S704A of FIG. 10A of the present embodiment, after performing the determination processing of the erecting direction illustrated in FIG. 5 in S703A, the control unit 70 holds the upper limit values for the vertical and horizontal sizes used for the determination processing of the erecting direction performed in S703A. In the case where the determination processing of the erecting direction is performed successfully (YES in S705A), the entire image is rotated in the determined erecting direction and the text-line segmentation is performed for all the rows on the entire image (S706A).

Thereafter, the area segmentation unit 70b excludes the rectangular areas of a character image whose heights Lh or widths Cw exceed the upper limit value for the vertical or horizontal size used for the determination processing of the erecting direction performed in S703A (S707A), and the OCR processing is performed on character images in all the remaining rectangular areas after exclusion (S708A).

Example of First Variation of Processing

Figure 10B:
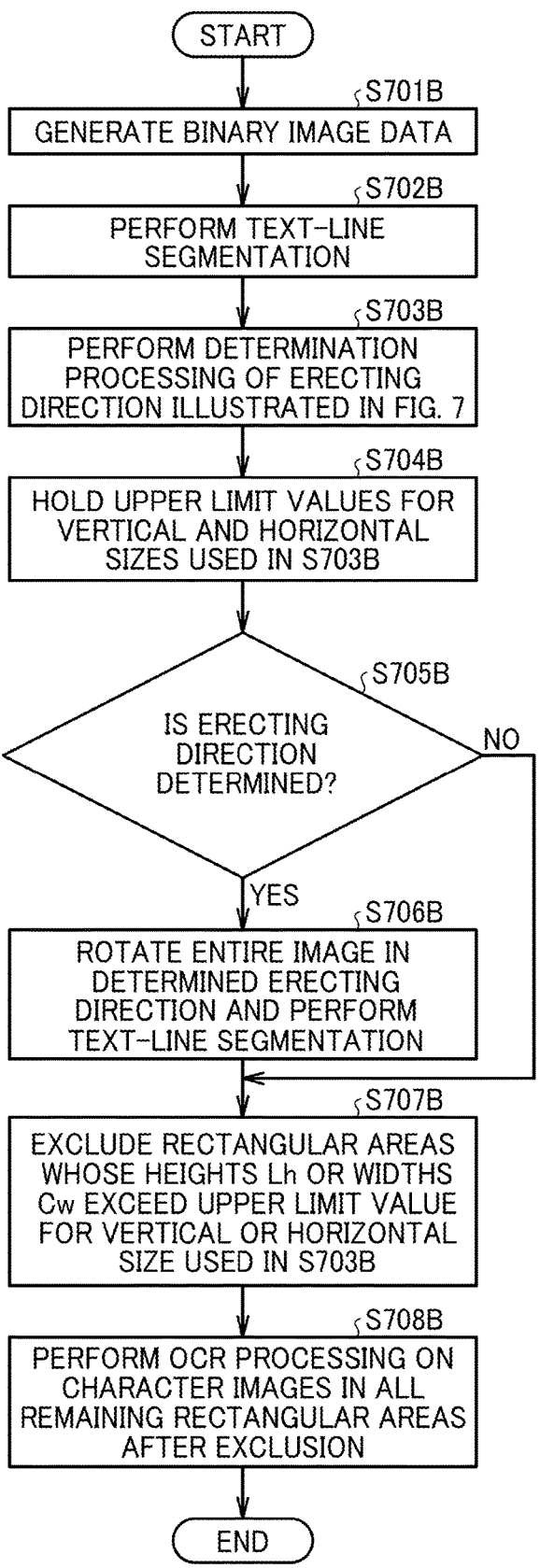

FIG. 10B is a flowchart illustrating an example of a first variation of the processing performed by one of the image processing apparatuses according to the fifth embodiment of the present disclosure.

The processing of S701B to S708B illustrated in FIG. 10B are variations of the processing of S701A to S708A illustrated in FIG. 10A, respectively.

In S704B of FIG. 10B of the present embodiment, after performing the determination processing of the erecting direction illustrated in FIG. 7 in S703B, the control unit 70 holds the upper limit values for the vertical and horizontal sizes used for the determination processing of the erecting direction performed in S703B. In a case where the determination processing of the erecting direction is performed successfully (YES in S705B), the entire image is rotated in the determined erecting direction and the text-line segmentation is performed on the entire image in S706B.

Thereafter, the area segmentation unit 70b excludes the character image rectangular areas whose heights Lh or widths Cw exceed the upper limit value for the vertical or horizontal size used for the determination processing of the erecting direction performed in S703B (S707B), and the OCR processing is performed on character images in all the remaining rectangular areas after exclusion (S708B).

Example of Second Variation of Processing

FIG. 10C is a flowchart illustrating an example of a second variation of the processing performed by one of the image processing apparatuses according to the fifth embodiment of the present disclosure.

The processing of S701C to S708C illustrated in FIG. 10C are variations of the processing of S701A to S708A illustrated in FIG. 10A, respectively.

In S704C of FIG. 10C of the present embodiment, after performing the determination processing of the erecting direction illustrated in FIG. 8 in S703C, the control unit 70 holds the upper limit values for the vertical and horizontal sizes used for the determination processing of the erecting direction performed in S703C. In a case where the determination processing of the erecting direction is performed successfully (YES in S705C), the entire image is rotated in the determined erecting direction and the text-line segmentation is performed on the entire image in S706C.

Thereafter, the area segmentation unit 70b excludes the character image rectangular areas whose heights Lh or widths Cw exceed the upper limit value for the vertical or horizontal size used for the determination processing of the erecting direction performed in S703C (S707C), and the OCR processing is performed on character images in all the remaining rectangular areas after exclusion (S708C).

Example of Third Variation of Processing

FIG. 10C is a flowchart illustrating an example of a third variation of the processing performed by one of the image processing apparatuses according to the fifth embodiment of the present disclosure.

The processing of S701D to S708D illustrated in FIG. 10D are variations of the processing of S701A to S708A illustrated in FIG. 10A, respectively.

In S704D of FIG. 10D of the present embodiment, after performing the determination processing of the erecting direction illustrated in FIG. 9 in S703D, the control unit 70 holds the upper limit values for the vertical and horizontal sizes used for the determination processing of the erecting direction performed in S703D. In a case where the determination processing of the erecting direction is performed successfully (YES in S705D), the entire image is rotated in the determined erecting direction and the text-line segmentation is performed on the entire image in S706D.

Thereafter, the area segmentation unit 70b excludes the rectangular areas of a character image whose heights Lh or widths Cw exceed the upper limit value for the vertical or horizontal size used for the determination processing of the erecting direction performed in S703D (S707D), and the OCR processing is performed on character images in all the remaining rectangular areas after exclusion (S708D).

As described above, the upper limit values for the vertical and horizontal sizes of a character image rectangular area newly set in performing a redetermination processing of the erecting direction are used for the subsequent OCR processing. Thus, in a case where the determination processing of the erecting direction does not result in being undetermined, the newly set upper limit values for the vertical and horizontal sizes of a character image rectangular area are highly likely to be appropriate. Consequently, the number of character images to be erroneously excluded is reduced in performing the subsequent OCR processing. As a result, a recognition rate of the OCR processing increases.

Note that, although the method of setting the upper limit values for the vertical and horizontal sizes of a character image rectangular area that is an object on which the OCR processing is performed before the OCR processing is performed in the present embodiment, the method of setting the upper limit values for the vertical and horizontal sizes of the character image rectangular area may be performed during the OCR processing. That is, the method is inputting all the character image rectangular areas having any vertical and horizontal sizes to an OCR processing body (e.g., an OCR processing library), but not performing the OCR processing on the character images in the rectangular areas whose vertical or horizontal sizes exceed a predetermine vertical or horizontal size in the OCR processing body. In such a case, the upper limit values for the vertical and horizontal sizes of character image rectangular areas on which the ORC processing is to be performed are usually passed to the OCR processing body as parameters. In the present embodiment, the newly set upper limit values for the vertical and horizontal sizes after the redetermination processing of the erecting direction are passed to the OCR body as parameters.

First Aspect

An image processing apparatus according to the present disclosure determines an erecting direction of a character image included in image data and performs ordinary character recognition on the character image along the erecting direction. The image forming apparatus includes the area segmentation unit 70b, the certainty calculation unit 70d, the erecting direction determination unit 70e, and the control unit 70. The area segmentation unit 70b sets upper limit values (first upper limit values) for vertical and horizontal sizes of the character image included in the image data and segments the image data in units of character into a plurality of rectangular areas satisfying the upper limit values for the vertical and horizontal sizes. The certainty calculation unit 70d performs the character recognition on the plurality of character images in the rectangular areas in four directions of a +X direction, a −X direction, a +Y direction, and a −Y direction and calculates degrees of certainty of the four directions. The erecting direction determination unit 70e determines a direction having the highest degree of certainty among the degrees of certainty of the four directions calculated by the certainty calculation unit 70d to be an erecting direction of the image data. In a case where the erecting direction determination unit 70e determines the erecting direction, the control unit 70 increases the upper limit values for the vertical and horizontal sizes to be set in the area segmentation unit 70b to be larger than the upper limit values (second limit values) for the vertical and horizontal sizes used in the ordinary character recognition.

According to the present aspect, since a character image rectangular area whose vertical or horizontal size is larger than the vertical or horizontal size of a character initially assumed is included in the targets for scoring by increasing the upper limit values for the vertical and horizontal sizes to be set in the area segmentation unit 70b, the number of cases in which the erecting direction is not determined is reduced. Consequently, the accuracy of the determination processing of the erecting direction increases.

Second Aspect

In a case where actual values of the vertical and horizontal sizes of a character image do not exceed the upper limit values for the vertical and horizontal sizes and the determination processing of the erecting direction performed by the erecting direction determination unit 70e results in being undetermined, the control unit 70 according to a second aspect increases the upper limit values for the vertical and horizontal sizes.

According to the present aspect, the upper limit values for the vertical and horizontal sizes of the rectangular area of a character image are increased for the first time in a case where the determination processing of the erecting direction performed by the erecting direction determination unit 70e results in being undetermined. That is, the character recognition is not affected in a case where the rectangular area of a character image whose vertical and horizontal sizes satisfy the vertical and horizontal sizes of a character initially assumed. On the other hand, only in a case where the rectangular area of a character image whose vertical or horizontal sizes is larger than the vertical or horizontal size of the character initially assumed, adaptive processing to increase the upper limit values for the vertical and horizontal sizes is performed.

Third Aspect

The image processing apparatus according to a third aspect includes the counting unit 70c that counts the number of character images having actual values of the vertical or horizontal sizes not exceeding the upper limit value in a row or a column of the rectangular areas segmented by the area segmentation unit 70b. In a case where the number of character images counted by the counting unit 70c is equal to or smaller than a reference value in a row or a column, the control unit 70 increases the upper limit values for the vertical and horizontal sizes.

According to the present aspect, in a case where the number of character images counted by the counting unit 70c is equal to or smaller than the reference value in a row or a column, the control unit 70 increases the upper limit values for the vertical and horizontal sizes. Thus, the number of cases in which a sufficient number of rectangular areas is obtained for performing the determination processing of the erecting direction increases and the number of cases in which the erecting direction is not determined decreases. Consequently, the accuracy of the determination processing of the erecting direction increases.

Fourth Aspect

The image processing apparatus according to a fourth aspect includes the counting unit 70c that counts the number of character images adjacent to each other in a row or a column out of the character images whose actual values of the vertical or horizontal sizes exceed the upper limit value for the vertical or horizontal size among the character image rectangular areas segmented by the area segmentation unit 70b. In a case where the number of character images adjacent to each other counted by the counting unit 70c is two or more in a row or a column for the first time, the control unit 70 increases the upper limit values for the vertical and horizontal sizes.

According to the present aspect, in a case where both of the character image rectangular areas adjacent to each other are excluded in the row in S505, the actual sizes of the character images in the rectangular areas may be larger than the character size initially assumed. Then, the upper limit values for the vertical and horizontal sizes of a character image rectangular area are increased. Thus, the number of cases in which a sufficient number of rectangular area of a character image is obtained for performing the determination processing of the erecting direction increases and the number of cases in which the erecting direction is not determined decreases. Consequently, the accuracy of the determination processing of the erecting direction increases.

Fifth Aspect

In a case where the number of character images counted by the counting unit 70c according to a fifth aspect is more than a half of the total number of the character images in the same row or the same column, the control unit 70 increases the upper limit values for the vertical and horizontal sizes.

According to the present aspect, in a case where more than a half of rectangular areas of a character image are excluded in a row, it is highly probable that the actual sizes of the character images in the rectangular areas are larger than the character size initially assumed. Then, the upper limit values for the vertical and horizontal sizes for a rectangular area of a character image are increased. Thus, the number of cases in which a sufficient number of rectangular area of a character image is obtained for performing the determination processing of the erecting direction increases and the number of cases in which the erecting direction is not determined decreases. Consequently, the accuracy of the determination processing of the erecting direction increases.

Sixth Aspect

The control unit 70 according to a sixth aspect extracts character images whose actual values of the vertical or horizontal sizes exceed the upper limit value for the vertical or horizontal size. In a case where the extracted character images exist in adjacent two rows or adjacent two columns, the control unit 70 controls the upper limit values for the horizontal and vertical sizes to be taken over.

According to the present aspect, by controlling to take over the increased upper limit values for the vertical and horizontal sizes in a case where the extracted character images exist in adjacent two rows or adjacent two columns, the upper limit values for the vertical and horizontal sizes are increased efficiently.

Seventh Aspect

In the image processing apparatus according to a seventh aspect, the certainty calculation unit 70d performs the character recognition on the character images in the rectangular areas in at least two directions out of the +X direction, the −X direction, the +Y direction, and the −Y direction to calculate degrees of certainty of the two directions in units of character images. The erecting direction determination unit 70e determines a direction having a degree of certainty larger than a predetermined threshold value of the degree of certainty and the degree of certainty of the other direction to be an erecting direction. When having increased the upper limit values for the vertical and horizontal sizes, the control unit 70 increases the predetermined threshold value of the degree of certainty.

According to the present aspect, since a character image rectangular area whose vertical or horizontal size is larger than the vertical or horizontal size of a character initially assumed is included in the targets for scoring, the threshold value of the degree of certainty is increased accordingly. Thus, a disadvantage to include a rectangular area that is actually a rectangular area of a photographic image in the targets for scoring is prevented. The rectangular area that is actually a rectangular area of a photographic image originally does not look like a character image rectangular area and is estimated to have a lower degree of certainty than a degree of certainty of a rectangular area of actually a character image. As a result, the upper limit values for the vertical and horizontal sizes of a character image rectangular area can be increased in a state in which the above-described disadvantage is reduced. Consequently, the accuracy of the determination processing of the erecting direction increases.

Eighth Aspect

In a case where at least one of the degrees of certainty of the four directions calculated by the certainty calculation unit 70d exceeds the first threshold value of the degree of certainty, the erecting direction determination unit 70e according to an eighth aspect accumulates only the highest of the degrees of certainty of the four directions in units of character images and divides the accumulated degree of certainty of each direction by the total number of accumulations for the four directions. In a case where one of the divided degrees of certainty of the four directions exceeds the second threshold value of the degree of certainty that is different from the first threshold value of the degree of certainty, the erecting direction determination unit 70e determines the direction whose divided degree of certainty exceeds the second threshold value of the degree of certainty to be an erecting direction.

According to the present aspect, the degree of certainty of only one character image is insufficient in reliability for character recognition. On the other hand, an extremely high degree of certainty is reliable for character recognition. By setting the threshold value (the top-bottom determination threshold value) for the normalized value of the degree of certainty calculated with a plurality of character images greater than the threshold value of the degree of certainty calculated with one character image, the accuracy of the determination processing of the erecting direction is secured.

Ninth Aspect

Assuming that, in a case where the erecting direction determination unit 70e performs the determination processing of the erecting direction, the control unit 70 according to a ninth aspect increases the upper limit values for the vertical and horizontal sizes to be set in the area segmentation unit 70b to be larger than the upper limit values for the vertical and horizontal sizes used in the ordinary character recognition. In such a case, the control unit 70 determines the upper limit values for the vertical and horizontal sizes of a character image rectangular area to be used in the ordinary character recognition based on the increased upper limit values for the vertical and horizontal sizes.

According to the present aspect, the upper limit values for the vertical and horizontal sizes of a character image rectangular area newly set in performing a redetermination processing of the erecting direction are used for the subsequent OCR processing. Thus, in a case where the determination processing of the erecting direction does not result in being undetermined, the newly set upper limit values for the vertical and horizontal sizes of a character image rectangular area are highly likely to be appropriate. Consequently, the number of character images to be erroneously excluded is reduced in performing the subsequent OCR processing. As a result, a recognition rate of the OCR processing increases.

Tenth Aspect

An image processing method according to a tenth aspect includes determining an erecting direction of a character image included in image data and performing ordinary character recognition on the character image along the erecting direction. The method further includes setting upper limit values for vertical and horizontal sizes of the character image included in the image data and segmenting the image data in units of character images into a plurality of rectangular areas satisfying the upper limit values for the vertical and horizontal sizes. The method further includes performing the character recognition on each of the plurality of character images in the rectangular areas in four directions of the +X direction, the −X direction, the +Y direction, and the −Y direction and calculating degrees of certainty of the four directions. The method further includes determining a direction having the highest degree of certainty among the calculated degrees of certainty of the four directions to be an erecting direction of the image data. The method further includes, in performing the determination processing of the erecting direction, increasing the upper limit values for the vertical and horizontal sizes to be set larger than the upper limit values for the vertical and horizontal sizes used in the ordinary character recognition.

According to the present aspect, since a rectangular area of a character image whose vertical or horizontal size is larger than the vertical or horizontal size of a character initially assumed is included in the targets for scoring by increasing the upper limit values for the vertical and horizontal sizes to be set in segmenting the image data, the number of cases in which the erecting direction is not determined is reduced. Consequently, the accuracy of the determination processing of the erecting direction increases.

Eleventh Aspect

A non-transitory recording medium according to an eleventh aspect stores a plurality of program codes which, when executed by one or more processors, causes the processors to perform a method, the method includes determining an erecting direction of a character image included in image data and performing ordinary character recognition on the character image along the erecting direction. The method further includes setting upper limit values for vertical and horizontal sizes of the character image included in the image data and segmenting the image data in units of character images into a plurality of rectangular areas satisfying the upper limit values for the vertical and horizontal sizes. The method further includes performing the character recognition on each of the plurality of character images in the rectangular areas in four directions of the +X direction, the −X direction, the +Y direction, and the −Y direction and calculating degrees of certainty of the four directions. The method further includes determining a direction having the highest degree of certainty among the calculated degrees of certainty of the four directions to be an erecting direction of the image data. The method further includes, in performing the determination processing of the erecting direction, increasing the upper limit values for the vertical and horizontal sizes to be set larger than the upper limit values for the vertical and horizontal sizes used in the ordinary character recognition.

According to the present aspect, since a rectangular area of a character image whose vertical or horizontal size is larger than the vertical or horizontal size of a character initially assumed is included in the targets for scoring by increasing the upper limit values for the vertical and horizontal sizes to be set in segmenting the image data, the number of cases in which the erecting direction is not determined is reduced. Consequently, the accuracy of the determination processing of the erecting direction increases.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus comprising circuitry configured to:
set first upper limit values for vertical and horizontal sizes of a character included in image data for erecting direction determination;
segment the image data in units of character into a plurality of rectangular areas;
determine, in the image data, a plurality of first rectangular areas each of which satisfies the first upper limit values;
perform character recognition on characters in the plurality of first rectangular areas in four directions of a +X direction, a −X direction, a +Y direction, and a −Y direction;
calculate degrees of certainty of the four directions;
determine whether a direction having a highest degree of certainty among the calculated degrees of certainty of the four directions is an erecting direction of the image data to output a determination result;
perform, along the erecting direction, character recognition on characters in a plurality of second rectangular areas of the image data, the plurality of second rectangular areas satisfying second upper limit values for the vertical and horizontal sizes smaller than the first upper limit values for erecting direction determination;
score one point in one of the four directions having the highest of the calculated degrees of certainty in a case where at least one of the calculated degrees of certainty exceeds a first threshold value of the degree of certainty;
divide a score in each direction by a total score in the four directions, to normalize the score in each direction; and
in a case where the normalized score in one of the four directions exceeds a second threshold value of the degree of certainty that is different from the first threshold, determine, as the erecting direction, the direction having the normalized score exceeding the second threshold value.

2. The image processing apparatus according to claim 1, wherein:
the circuitry is configured to increase the first upper limit values for the vertical and horizontal sizes in a case where the plurality of rectangular areas includes a rectangular area having a vertical or horizontal size not exceeding the first upper limit value and the determination result indicates that the erecting direction is undetermined.

3. The image processing apparatus according to claim 1, wherein:
the circuitry is further configured to:
count, in a row or a column of the plurality of rectangular areas, a number of characters having vertical or horizontal sizes not exceeding the first upper limit value for the vertical or horizontal size; and
increase the first upper limit values for the vertical and horizontal sizes in a case where the counted number of characters is equal to or smaller than a reference value in the row or the column.

4. The image processing apparatus according to claim 1, wherein:
the circuitry is configured to:
count, in a row or a column of the plurality of rectangular areas, a number of characters adjacent to each other having vertical or horizontal sizes exceeding the first upper limit value for the vertical or horizontal size; and
increase the first upper limit values in a case where the counted number of characters adjacent to each other is two or more in the row or the column for a first time.

5. The image processing apparatus according to claim 3, wherein:
the circuitry is configured to increase the first upper limit values for the vertical and horizontal sizes in a case where the counted number of characters is more than a half of a total number of the characters in a same row or a same column.

6. The image processing apparatus according to claim 1, wherein:
the circuitry is further configured to:
extract characters having vertical or horizontal sizes exceeding the first upper limit value for the vertical or horizontal size; and
control the first upper limit values to be taken over in a case where the extracted characters exist in adjacent two rows or adjacent two columns.

7. The image processing apparatus according to claim 1, wherein:
the circuitry is configured to:
determine the direction having the highest degree of certainty to be the erecting direction in a case where the highest degree of certainty is larger than a predetermined value of the degree of certainty; and
increase the predetermined value of the degree of certainty in a case where the first upper limit values for the vertical and horizontal sizes are increased.

8. The image processing apparatus according to claim 1, wherein:
the circuitry is configured to:
set the second upper limit values for the vertical and horizontal sizes based on the first upper limit values for erecting direction determination.

9. An image processing method, the method comprising:
setting first upper limit values for vertical and horizontal sizes of a character included in image data for erecting direction determination;
segmenting the image data in units of character into a plurality of rectangular areas;
determining, in the image data, a plurality of first rectangular areas each of which satisfies the first upper limit values;
performing character recognition on characters in the plurality of first rectangular areas in four directions of a +X direction, a −X direction, a +Y direction, and a −Y direction;
calculating degrees of certainty of the four directions;
determining whether a direction having a highest degree of certainty among the calculated degrees of certainty of the four directions is an erecting direction of the image data to output a determination result;
performing, along the erecting direction, character recognition on characters in a plurality of second rectangular areas of the image data, the plurality of second rectangular areas satisfying second upper limit values for the vertical and horizontal sizes smaller than the first upper limit values for erecting direction determination;
scoring one point in one of the four directions having the highest of the calculated degrees of certainty in a case where at least one of the calculated degrees of certainty exceeds a first threshold value of the degree of certainty;
dividing a score in each direction by a total score in the four directions, to normalize the score in each direction; and
in a case where the normalized score in one of the four directions exceeds a second threshold value of the degree of certainty that is different from the first threshold, determining, as the erecting direction, the direction having the normalized score exceeding the second threshold value.

10. A non-transitory recording medium storing a plurality of program codes which, when executed by one or more processors, causes the processors to perform a method, the method comprising:
setting first upper limit values for vertical and horizontal sizes of a character included in image data for erecting direction determination;
segmenting the image data in units of character into a plurality of rectangular areas;
determining, in the image data, a plurality of first rectangular areas each of which satisfies the first upper limit values;
performing character recognition on characters in the plurality of first rectangular areas in four directions of a +X direction, a −X direction, a +Y direction, and a −Y direction;
calculating degrees of certainty of the four directions;
determining whether a direction having a highest degree of certainty among the calculated degrees of certainty of the four directions is an erecting direction of the image data to output a determination result;
performing, along the erecting direction, character recognition on characters on a plurality of second rectangular areas of the image data, the plurality of second rectangular areas satisfying second upper limit values for the vertical and horizontal sizes smaller than the first upper limit values for erecting direction determination;
scoring one point in one of the four directions having the highest of the calculated degrees of certainty in a case where at least one of the calculated degrees of certainty exceeds a first threshold value of the degree of certainty;
dividing a score in each direction by a total score in the four directions, to normalize the score in each direction; and
in a case where the normalized score in one of the four directions exceeds a second threshold value of the degree of certainty that is different from the first threshold, determining, as the erecting direction, the direction having the normalized score exceeding the second threshold value.

* * * * *